US012617181B2

(12) United States Patent
Yoshida

(10) Patent No.: US 12,617,181 B2
(45) Date of Patent: May 5, 2026

(54) MULTILAYER STRUCTURE, AND PACKAGING MATERIAL FOR RETORT USING SAME

(71) Applicant: KURARAY CO., LTD., Okayama (JP)

(72) Inventor: Kentaro Yoshida, Kurashiki (JP)

(73) Assignee: KURARAY CO., LTD., Okayama (JP)

( * ) Notice: Subject to any disclaimer, the term of this patent is extended or adjusted under 35 U.S.C. 154(b) by 368 days.

(21) Appl. No.: 17/920,613

(22) PCT Filed: Apr. 22, 2021

(86) PCT No.: PCT/JP2021/016310

§ 371 (c)(1),
(2) Date: Oct. 21, 2022

(87) PCT Pub. No.: WO2021/215501

PCT Pub. Date: Oct. 28, 2021

(65) Prior Publication Data

US 2023/0150236 A1 May 18, 2023

(30) Foreign Application Priority Data

Apr. 24, 2020 (JP) ................................ 2020-077030

(51) Int. Cl.

| | |
|---|---|
| ***B32B 7/02*** | (2019.01) |
| ***B29C 48/00*** | (2019.01) |
| ***B29C 48/08*** | (2019.01) |
| ***B29C 48/21*** | (2019.01) |
| ***B29C 55/12*** | (2006.01) |
| ***B29K 23/00*** | (2006.01) |
| ***B29K 77/00*** | (2006.01) |
| ***B32B 7/12*** | (2006.01) |
| ***B32B 27/08*** | (2006.01) |
| ***B32B 27/30*** | (2006.01) |
| ***B32B 27/32*** | (2006.01) |
| ***B32B 27/34*** | (2006.01) |
| ***B65D 65/40*** | (2006.01) |
| ***C08J 7/048*** | (2020.01) |
| ***C08J 7/06*** | (2006.01) |
| ***C08L 29/04*** | (2006.01) |
| ***C08L 31/04*** | (2006.01) |

(52) U.S. Cl.

CPC ................ *B32B 7/02* (2013.01); *B32B 27/08* (2013.01); *B32B 27/306* (2013.01); *B32B 27/32* (2013.01); *B32B 27/34* (2013.01); *B65D 65/40* (2013.01); *C08J 7/048* (2020.01); *C08J 7/06* (2013.01); *C08L 29/04* (2013.01); *C08L 31/04* (2013.01); *B29C 48/0018* (2019.02); *B29C 48/08* (2019.02); *B29C 48/21* (2019.02); *B29C 55/12* (2013.01); *B29K 2023/086* (2013.01); *B29K 2023/12* (2013.01); *B29K 2077/00* (2013.01); *B32B 7/12* (2013.01); *B32B 2250/24* (2013.01); *B32B 2255/10* (2013.01); *B32B 2255/20* (2013.01); *B32B 2270/00* (2013.01); *B32B 2307/414* (2013.01); *B32B 2307/518* (2013.01); *B32B 2307/7244* (2013.01); *B32B 2307/732* (2013.01); *B32B 2439/70* (2013.01); *C08J 2323/08* (2013.01); *C08J 2329/04* (2013.01); *C08J 2477/02* (2013.01)

(58) Field of Classification Search

CPC ..... B32B 27/306; B32B 27/32; B32B 27/327; B32B 2250/20; B32B 2250/205; C08L 31/04; C08L 29/04; C08L 33/24

See application file for complete search history.

(56) References Cited

U.S. PATENT DOCUMENTS

| | | | | |
|---|---|---|---|---|
| 2015/0210788 A1* | 7/2015 | Okamoto | ................ B32B 27/32 524/557 |
| 2016/0215116 A1 | 7/2016 | Kani | |
| 2017/0267851 A1 | 9/2017 | Yamakoshi et al. | |

FOREIGN PATENT DOCUMENTS

| | | | |
|---|---|---|---|
| JP | H05-208475 A | | 8/1993 |
| JP | H07-097491 A | | 4/1995 |
| JP | 2001-064424 A | | 3/2001 |
| JP | 2001200123 A | * | 7/2001 |
| JP | 2002-308285 A | | 10/2002 |
| JP | 2002-331578 A | | 11/2002 |
| JP | 2015-110734 A | | 6/2015 |
| JP | 2015-151428 A | | 8/2015 |
| WO | 2015/174396 A1 | | 11/2015 |

OTHER PUBLICATIONS

Machine translation of JP H05-208475. Retrieved Nov. 22, 2024.*

(Continued)

*Primary Examiner* — Prashant J Khatri

(74) *Attorney, Agent, or Firm* — Morgan, Lewis & Bockius LLP

(57) ABSTRACT

There is provided a multilayer structure comprising at least a barrier resin layer (X) and an inorganic barrier layer (Y) with a thickness of 500 nm or less which is adjacent to the barrier resin layer (X), wherein the layer (X) is made of a resin composition (x) comprising an ethylene-vinyl alcohol copolymer (A) and a polyamide (B) in a mass ratio (A/B) of 55/45 to 98/2, and the ethylene-vinyl alcohol copolymer (A) has an ethylene content of 20 to 46 mol % and a saponification degree of 90 mol % or more. Thus, there can be provided a multilayer structure having excellent gas barrier properties and appearance even after being subjected to stretching process or retorting process followed by bending process, and a packaging material for retort therewith.

18 Claims, No Drawings

(56) References Cited

OTHER PUBLICATIONS

Tabatabaei et al. (ed. DeMeuse, M.T.). "Chapter 15: Applications of biaxial stretched films", Biaxial stretching of film: Principles and applications, (2011); pp. 231-239.*
Machine translation of JP 2001-200123. Retrieved Aug. 13, 2025.*
International Search Report issued in corresponding International Patent Application No. PCT/JP2021/016310 dated Jul. 20, 2021.

* cited by examiner

MULTILAYER STRUCTURE, AND PACKAGING MATERIAL FOR RETORT USING SAME

TECHNICAL FIELD

The present invention relates to a multilayer structure having at least a barrier resin layer made of a resin composition containing an ethylene-vinyl alcohol copolymer and a polyamide, and an inorganic barrier layer which is laminated in adjacent to the barrier resin layer; and a packaging material for a retort therewith; and a method for recovering the multilayer structure and a recovered composition comprising a recovered material of the multilayer structure.

BACKGROUND ART

Packaging materials for long-term storage of foods are often required to have gas barrier properties such as oxygen barrier ability. Oxidation of foods by oxygen and propagation of microorganisms can be suppressed by using a packaging material having higher gas barrier properties. As foods with a further extended edible period, retort foods have increased, which are prepared by filling a packaging material with foods and then sterilizing it by hot water under pressure (hereinafter, sometimes simply abbreviated as "retorting process"). A gas barrier layer for packaging materials for a retort is required to be resistant to hot-water treatment (hereinafter, sometimes simply abbreviated as "retort resistance"), and an aluminum foil or a gas barrier film in which a transparent vapor-deposited layer of silicon oxide or aluminum oxide is laminated on a highly heat-resistant polyester film is commonly used. When an aluminum foil is used, not only gas barrier properties but also shading performance can be imparted, and when a gas barrier film in which a vapor-deposited layer of silicon oxide or aluminum oxide is laminated is used, visibility of a content can be imparted (Patent References No. 1 and 2).

An ethylene-vinyl alcohol copolymer (hereinafter, sometimes abbreviated as "EVOH") which is widely used as a gas barrier resin in a packaging material, is crystallized and densified by hydrogen bonding between hydroxy groups in the molecule, exhibiting gas barrier properties. Furthermore, a resin composition prepared by blending EVOH and a polyamide (hereinafter, sometimes abbreviated as "PA") has higher retort resistance than EVOH as a simple substance, so that it has been preferably used as a packaging material for retort (Patent Reference No. 3). Furthermore, it has been reported that a resin composition prepared by blending a particular modified EVOH and a polyamide has excellent retort resistance and bending resistance (Patent Reference No. 4).

In recent years, demand for so-called post-consumer recycling (hereinafter, sometimes simply abbreviated as "recycling") in which packaging materials consumed in the market are recovered and recycled, has been globally increased due to environmental problems and waste problems. Recycling is generally conducted by a process comprising cutting a recovered packaging material and, after, if necessary, sorting and washing, melt-mixing it using an extruder.

PRIOR ART REFERENCES

Patent References

Patent Reference No. 1: JP 2002-331578 A
Patent Reference No. 2: JP 2002-308285 A
Patent Reference No. 3: WO 2015/174396 A1
Patent Reference No. 4: JP 2015-151428 A

SUMMARY OF THE INVENTION

Problems to be Solved by the Invention

However, while a gas barrier films with a laminated transparent vapor-deposited layer can maintain excellent gas barrier properties even after retorting process, there is concern that the gas barrier properties may be easily deteriorated due to stretching or bending processes, causing fluctuations in quality of a food to be packaged. In addition, although EVOH exhibits higher gas barrier properties in a dry state, the gas barrier properties are deteriorated due to relaxation of hydrogen bonding when the material absorbs moisture, such as after retorting process, and it may limit extension of an edible period of a retort food. Meanwhile, aluminum foils or polyester films which are widely used in conventional packaging material for retort are difficult to uniformly mix with other components in a melt-mixing process during recovery and recycling, which has been an obstacle to their recycling.

In view of these circumstances, a first object of the present invention is to provide a multilayer structure having excellent gas barrier properties and appearance even after stretching or retorting followed by bending processes, and packaging material for retort therewith. A second object of the present invention is to provide a multilayer structure further having excellent recyclability in addition to the above properties, and a method for recovering the same.

Means for Solving the Problems

The inventors have found that a multilayer structure having a structure where a resin layer made of a resin composition containing a particular EVOH and PA and an inorganic layer are laminated by a method represented by vapor deposition such that these layers are adjacent to each other has excellent gas barrier properties and appearance even after stretching process or retorting process followed by bending process. The inventors have further found that by specifying the materials and the configuration used for a multilayer structure, recyclability can be also excellent in addition to the above properties, and have achieved the present invention. Specifically, the above problems can be solved by providing the followings.

[1] A multilayer structure comprising at least a barrier resin layer (X) and an inorganic barrier layer (Y) with a thickness of 500 nm or less which is adjacent to the barrier resin layer (X), wherein the layer (X) is made of a resin composition (x) comprising an ethylene-vinyl alcohol copolymer (A) and a polyamide (B) in a mass ratio (A/B) of 55/45 to 98/2, and the ethylene-vinyl alcohol copolymer (A) has an ethylene content of 20 to 46 mol % and a saponification degree of 90 mol % or more;

[2] The multilayer structure according to [1], wherein the ethylene-vinyl alcohol copolymer (A) is a modified ethylene-vinyl alcohol copolymer (A2) represented by Formula (I); content rates (mol %) of a, b and c to the total monomer units satisfy Formulas (1) to (3); and a saponification degree defined by Formula (4) is 90 mol % or more:

(I)

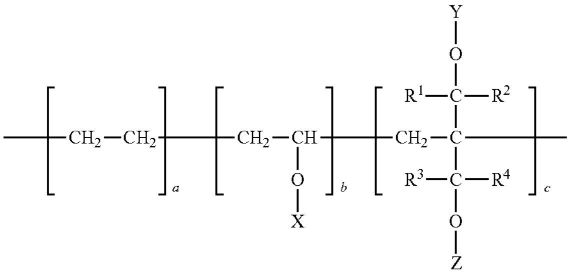

wherein $R^1$, $R^2$, $R^3$ and $R^4$ independently of each other represent a hydrogen atom or an alkyl group having 1 to 10 carbon atoms, and the alkyl group can comprise a hydroxy group, an alkoxy group or a halogen atom; X, Y and Z independently of each other represent a hydrogen atom, a formyl group or an alkanoyl group having 2 to 10 carbon atoms:

$$20 \leq a \leq 46 \quad (1)$$

$$0.3 \leq c \leq 10 \quad (2)$$

$$[100-(a+c)] \times 0.95 \leq b \leq [100-(a+c)] \quad (3)$$

Saponification degree=[(the total molar number of X, Y and Z as a hydrogen atom)/(the total molar number of X, Y and Z)]×100 (4);

[3] The multilayer structure according to [1] or [2], wherein the resin composition (x) comprises 20 to 400 ppm of at least one type of multivalent metal ions (C) selected from the group consisting of magnesium ions, calcium ions and zinc ions;

[4] The multilayer structure according to any of [1] to [3], wherein the barrier resin layer (X) is a monolayer film with a thickness of 8 to 40 μm;

[5] The multilayer structure according to [4], wherein the monolayer film is biaxially oriented;

[6] The multilayer structure according to any of [1] to [3], wherein the barrier resin layer (X) is one layer of a coextruded film consisting of 2 or more layers comprising the barrier resin layer (X); a thickness of the coextruded film is 8 to 120 μm; and a thickness of the barrier resin layer (X) is 0.5 to 20 μm;

[7] The multilayer structure according to [6], wherein the coextruded film is biaxially oriented;

[8] The multilayer structure according to [6] or [7], wherein layers other than the barrier resin layer (X) in the coextruded film consists of layers comprising a polypropylene resin as a main component;

[9] The multilayer structure according to any of [1] to [8], wherein the multilayer structure does not comprise a layer comprising a resin having a melting point of lower than 140° C. as a main component, a layer comprising a resin having a melting point of 240° C. or higher as a main component, nor a metal layer with a thickness of 1 μm or more;

[10] The multilayer structure according to any of [1] to [9], wherein a ratio of the total thickness of the layers comprising a polypropylene resin as a main component to the total thickness of the multilayer structure is 0.75 or more;

[11] A packaging material for retort comprising the multilayer structure according to any of [1] to [10];

[12] The packaging material for retort according to [11], wherein at least one barrier resin layer (X) is outer than the inorganic barrier layer (Y);

[13] The packaging material for retort according to [11] or [12], wherein an oxygen transmission rate (under the conditions of 20° C. and 65% RH) after a retorting process at 125° C. for 60 min is less than 10 cc/($m^2$·day·atm);

[14] The packaging material for retort according to any of [11] to [13], wherein a light transmittance at a wavelength of 600 nm after a retorting process at 125° C. for 60 min is 80% or more;

[15] A recovered composition comprising a recovered material of the multilayer structure according to any of [1] to [10];

[16] A method for recovering a multilayer structure comprising pulverizing the multilayer structure according to any of [1] to [10] followed by melt molding.

Effects of the Invention

The multilayer structure of the invention has excellent gas barrier properties and appearance after stretching process or retorting process followed by bending process, and thus preferably used for a packaging material for retort. In addition, the multilayer structure of the present invention has excellent uniformity with less hard spots and coloring when being melt-molded after pulverizing. It can, therefore, provide a packaging material for a retort which is highly applicable to recycling.

MODES FOR CARRYING OUT THE INVENTION

There will be described embodiments of the present invention. In the following description, specific materials (compounds and the like), which exhibit a particular function may be exemplified, but the present invention is not limited to an aspect using such a material. Furthermore, unless otherwise specified, the exemplified materials can be used alone or in combination.

<Resin Composition (x) and Barrier Resin Layer (X)>

The multilayer structure of the present invention has a barrier resin layer (X) made of a resin composition (x) containing EVOH (A) and PA (B) in a mass ratio (A/B) of 55/45 to 98/2. In a wet resin composition (x), gas barrier properties are relatively deteriorated, whereas in a dry state, gas barrier properties, retort resistance, stretch resistance and bending resistance are excellent, so that the multilayer structure having the barrier resin layer (X) made of the resin composition (x) is preferably used as a component for a packaging material for retort. Furthermore, the resin composition (x) is highly thermostable so that it can be stably melt-molded for a long period. In order to balance the above properties at a high level, the lower limit of a mass ratio (A/B) of EVOH (A) to PA (B) must be 55/45, and it is preferably 65/35 or optionally 78/22. When melt-molding processability is particularly important, the lower limit of a mass ratio (A/B) of EVOH (A) to PA (B) is sometimes preferably 83/17. Meanwhile, the upper limit of a mass ratio (A/B) of EVOH (A) to PA (B) should be 98/2, preferably 96/4, or optionally 93/7. When retort resistance is particularly important, a mass ratio (A/B) of EVOH (A) to PA (B) is sometimes preferably 87/13. If the mass ratio (A/B) is less than 55/45, thickening or gelation tends to occur during melt molding of the resin composition (x) or pulverized product of the obtained multilayer structure. Meanwhile, if the mass ratio (A/B) is more than 98/2, gas barrier properties or appearance may be deteriorated after stretching process or bending process. Since the resin composition (x) has excellent secondary processability, it can be applied to various secondary processes such as uniaxial orientation, biaxial orientation, and drawing. In particular, when the barrier resin layer (X) is uniaxially or biaxially oriented, properties such as gas barrier properties and mechanical properties of the multilayer structure of the present invention can be further improved. In the light of inhibiting anisotropy of mechanical properties, biaxial orientation is more preferable. Furthermore, since the resin composition (x) can be easily melt-mixed with a polyolefin resin such as polyethylene and polypropylene, there can be provided a packaging material for retort with excellent recyclability. The total content of EVOH (A) and PA (B) in the resin composition (x) is preferably 70 mass % or more, more preferably 90 mass % or more, further preferably 95 mass % or more.

<EVOH (A)>

EVOH (A) is usually produced by saponifying an ethylene-vinyl ester copolymer obtained by polymerizing ethylene and a vinyl ester. An ethylene unit content of EVOH (A) is 20 to 46 mol %. If a content rate of ethylene units is less than 20 mol %, melt moldability, secondary processability and hot-water resistance of a pulverized product of a resin composition (x) and an obtained multilayer structure may be deteriorated. The ethylene unit content is preferably 25 mol % or more, more preferably 30 mol % or more. Meanwhile, with a content rate of ethylene units being more than 46 mol %, gas barrier properties of the resin composition (x) may be insufficient and a post-retorting appearance of an obtained multilayer structure may be deteriorated. An ethylene unit content is preferably 40 mol % or less. A saponification degree of EVOH (A) is 90 mol % or more. A saponification degree means a ratio of the number of vinyl alcohol units to the total number of vinyl alcohol units and vinyl ester units in EVOH (A). With a saponification degree of 90 mol % or more, gas barrier properties of the resin composition (x) and the obtained multilayer structure are improved. The saponification degree is preferably 95 mol % or more, more preferably 99 mol % or more. An ethylene unit content and a saponification degree of EVOH (A) can be determined by NMR spectrometry. EVOH (A) can consist of 2 or more EVOHs with different ethylene unit contents and saponification degrees.

EVOH (A) can contain monomer units other than ethylene, a vinyl ester and vinyl alcohol as long as the effects of the present disclosure are not impaired. A content of the other monomer units is preferably 5% by mass or less, more preferably 3% by mass or less, further preferably 1% by mass or less, and particularly preferably the other monomer units are substantially absent. Examples of such other monomers include α-olefins such as propylene, n-butene, isobutylene and 1-hexene; acrylic acid and salts thereof; unsaturated monomers having an acrylic ester group; methacrylic acid and salts thereof; unsaturated monomers having a methacrylic ester group; acrylamide, N-methylacrylamide, N-ethylacrylamide, N,N-dimethylacrylamide, diacetone acrylamide, acrylamidopropanesulfonic acid and salts thereof, acrylamidopropyldimethylamine and salts thereof (for example, quaternary salts); methacrylamide, N-methylmethacrylamide, N-ethylmethacrylamide, methacrylamidopropanesulfonic acid and salts thereof, methacrylamidopropyldimethylamine and salts thereof (for example, quaternary salts); vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether and 2,3-diacetoxy-1-vinyloxypropane; vinyl cyanides such as acrylonitrile and methacrylonitrile; vinyl halides such as vinyl chloride and vinyl fluoride; vinylidene halides such as vinylidene chloride and vinylidene fluoride; allyl compounds such as allyl acetate, 2,3-diacetoxy-1-allyloxypropane and allyl chloride; unsaturated dicarboxylic acid such as maleic acid, itaconic acid and fumaric acid, and salts or esters thereof; vinylsilane compounds such as vinyltrimethoxysilane; and isopropenyl acetate.

An MFR (210° C., under a load of 2.16 kg) of EVOH (A) is preferably 0.5 to 50 g/10 min. The lower limit of an MFR of EVOH (A) is more preferably 1 g/10 min, further preferably 2 g/10 min. Meanwhile, the upper limit of an MFR of EVOH (A) is more preferably 30 g/10 min, further preferably 15 g/10 min. With an MFR of EVOH (A) being within the above range, melt moldability of the resin composition (x) is improved.

<Modified EVOH (A2)>

EVOH (A) can be a modified ethylene-vinyl alcohol copolymer (A2) represented by Formula (I). Here, content rates (mol %) of a, b and c to the total monomer units satisfy Formulas (1) to (3); and a saponification degree defined by Formula (4) is 90 mol % or more:

(I)

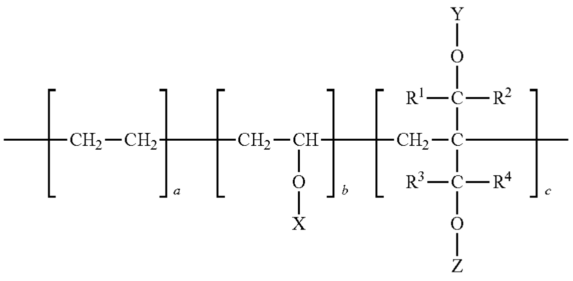

wherein $R^1$, $R^2$, $R^3$ and $R^4$ independently of each other represent a hydrogen atom or an alkyl group having 1 to 10 carbon atoms, and the alkyl group can comprise a hydroxy group, an alkoxy group or a halogen atom; X, Y and Z independently of each other represent a hydrogen atom, a formyl group or an alkanoyl group having 2 to 10 carbon atoms:

$$20 \leq a \leq 46 \quad (1)$$

$$0.3 \leq c \leq 10 \quad (2)$$

$$[100-(a+c)] \times 0.95 \leq b \leq [100-(a+c)] \quad (3)$$

$$\text{Saponification degree} = [(\text{the total molar number of } X, Y \text{ and } Z \text{ as a hydrogen atom})/(\text{the total molar number of } X, Y \text{ and } Z)] \times 100 \quad (4).$$

A modified EVOH (A2), which has, in addition to ethylene units and vinyl alcohol units, monomer units having a 1,3-diol structure in a main chain in a copolymer, is less crystalline than EVOH free from the monomer units, and can be thus improved in stretch resistance, bending resistance and secondary processability. Since it has a lower crystallization speed than EVOH free from the monomer units, interlayer adhesiveness of a multilayer structure having a layer made of the modified EVOH (A2) can be improved. Furthermore, this modified EVOH (A2) can reduce deterioration of gas barrier properties caused by low crystallinity, due to strong hydrogen bonding strength of a 1,3-diol structure. Furthermore, the multilayer structure of the present invention comprising the modified EVOH (A2) exhibits superior recovery after deformation and/or dimension change due to stretching process or bending process. So that, for example, it would be able to reduce defects in an inorganic barrier layer (Y) described later, caused by stretching process or bending process.

In Formula (I), $R^1$, $R^2$, $R^3$ and $R^4$ independently of each other represent a hydrogen atom or an alkyl group having 1 to 10 carbon atoms. $R^1$, $R^2$, $R^3$ and $R^4$ can be the same or different. There are no particular restrictions to the structure of the alkyl group, which can have partly a branched or cyclic structure. Furthermore, the alkyl group can contain a hydroxy group, an alkoxy group or a halogen atom. $R^1$, $R^2$, $R^3$ and $R^4$ are preferably a hydrogen atom or an alkyl group having 1 to 5 carbon atoms, more preferably a hydrogen atom. Preferable examples of the alkyl group include straight or branched alkyl groups such as a methyl group, an ethyl group, an n-propyl group, an iso-propyl group, an n-butyl group, an iso-butyl group, a tert-butyl group and a pentyl group.

In Formula (I), X, Y and Z independently of each other represent a hydrogen atom, a formyl group or an alkanoyl group having 2 to 10 carbon atoms. When X, Y or Z are a hydrogen atom, Formula (I) has a hydroxy group, and when X, Y or Z is a formyl group or an alkanoyl group, Formula (I) has an ester group. The alkanoyl group is preferably an alkanoyl group having 2 to 5 carbon atoms, and preferable examples include an acetyl group, a propanoyl group and a butanoyl group. Among these, an acetyl group is particularly preferable. Preferably, any of X, Y and Z is a hydrogen atom or a mixture containing a hydrogen atom.

A monomer unit containing X is generally obtained by saponifying a vinyl ester. Therefore, X is preferably a mixture of a hydrogen atom and a formyl group or an alkanoyl group having 2 to 10 carbon atoms. In the light of availability and a production cost of a monomer (vinyl acetate), X is particularly preferable a mixture of a hydrogen atom and an acetyl group.

On the other hand, monomer units containing Y and Z can also be produced by copolymerizing unsaturated monomer units having a 1,3-diester structure and then saponifying them, or by directly copolymerizing unsaturated monomer units having a 1,3-diol structure. Thus, both Y and Z can be a hydrogen atom only, or a mixture of a hydrogen atom and a formyl group or an alkanoyl group having 2 to 10 carbon atoms, more preferably can be a mixture of a hydrogen atom and an acetyl group.

In the modified EVOH (A2), content rates (mol %) of a, b and c to the total monomer units satisfy Formulas (1) to (3).

$$20 \le a \le 46 \qquad (1)$$

$$0.3 \le c \le 10 \qquad (2)$$

$$[100-(a+c)] \times 0.95 \le b \le [100-(a+c)] \qquad (3)$$

"a" represents a content rate (mol %) of ethylene units to the total monomer units, and is 20 to 46 mol %. If the content rate of ethylene units is less than 20 mol %, a pulverized product of the resin composition (x) and the obtained multilayer structure may be deteriorated in melt moldability, secondary processability and hot-water resistance. "a" is preferably 25 mol % or more, more preferably 30 mol % or more. Meanwhile, if the content rate of ethylene units is more than 46 mol %, gas barrier properties of the resin composition (x) may be insufficient, and appearance of the obtained multilayer structure after retorting process may be deteriorated. "a" is preferably 40 mol % or less.

"c" represents a content rate (mol %) of monomer units containing Y and Z indicated at the right end of Formula (I) to the total monomer units, and is 0.3 to 10 mol %. When "c" is within the above range, the resin composition (x) has excellent stretch resistance, bending resistance and secondary processability, and in particular, even when the obtained multilayer structure is bent after retorting process, it has excellent gas barrier properties. "c" is preferably 0.8 mol % or more, more preferably 1.3 mol % or more. "c" is preferably 7 mol % or less, more preferably 4 mol % or less.

"b" represents a content rate (mol %) of vinyl alcohol units and vinyl ester units to the total monomer units, and satisfies Formula (3).

$$[100-(a+c)] \times 0.95 \le b \le [100-(a+c)] \qquad (3)$$

This means that in modified EVOH (A2), 90% or more of monomer units other than ethylene units and monomer units containing Y and Z indicated at the right end of Formula (I) are vinyl alcohol units or vinyl ester units. If Formula (3) is not satisfied, gas barrier properties of the resin composition (x) and the obtained multilayer structure are insufficient. Preferably, Formula (3') is satisfied, and more preferably Formula (3) is satisfied.

$$[100-(a+c)] \times 0.95 \le b \le [100-(a+c)] \qquad (3')$$

$$[100-(a+c)] \times 0.98 \le b \le [100-(a+c)] \qquad (3'')$$

A saponification degree defined by Formula (4) in modified EVOH (A2) is 90 mol % or more.

$$\text{Saponification degree} = [(\text{the total molar number of } X, Y \text{ and } Z \text{ as a hydrogen atom})/(\text{the total molar number of } X, Y \text{ and } Z)] \times 100 \qquad (4)$$

Here, "the total molar number of X, Y and Z as a hydrogen atom" represents a molar number of hydroxy groups, and "the total molar number of X, Y and Z" represents the total molar number of hydroxy groups and ester groups. If a saponification degree is less than 90 mol %, gas barrier properties and thermal stability are insufficient in the resin composition (x) and the obtained multilayer structure, and gel or hard spots tend to generate during melt molding. A saponification degree is preferably 95 mol % or more, more preferably 99 mol % or more.

Content rates of monomer units represented by "a", "b" and "c" and a saponification degree in modified EVOH (A2) are determined by NMR spectrometry. When modified EVOH (A2) consists of a mixture of two or more different modified EVOHs, content rates of monomer units represented by "a", "b" and "c" and a saponification degree are also determined for the mixture of modified EVOHs by NMR spectrometry.

There are no particular restrictions to a method for producing modified EVOH (A2). For example, ethylene, a vinyl ester represented by Formula (II) and an unsaturated monomer represented by Formula (III) are subjected to radical polymerization to produce a modified ethylene-vinyl ester copolymer represented by Formula (IV), which is then saponified.

(II)

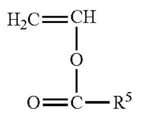

In Formula (II), $R^5$ represents a hydrogen atom or an alkyl group having 1 to 9 carbon atoms. The carbon number of the alkyl group is preferably 1 to 4. Examples of a vinyl ester represented by Formula (II) include vinyl formate, vinyl acetate, vinyl propionate, vinyl butyrate, vinyl isobutyrate, vinyl pivalate, vinyl versatate and vinyl caproate. Economically, vinyl acetate is preferable.

(III)

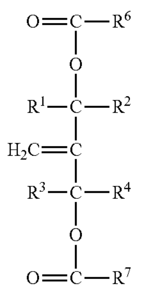

In Formula (III), $R^1$, $R^2$, $R^3$ and $R^4$ are as defined for Formula (I). $R^6$ and $R^7$ independently of each other represent a hydrogen atom or an alkyl group having 1 to 9 carbon atoms. The carbon number of the alkyl group is preferably 1 to 4. Examples of an unsaturated monomer represented by Formula (III) include 2-methylene-1,3-propanediol diacetate (1,3-diacetoxy-2-methylenepropane), 2-methylene-1,3-propanediol dipropionate, and 2-methylene-1,3-propanediol dibutyrate. Among these, 2-methylene-1,3-propanediol diacetate is preferably used in the light of its ease of production. In terms of 2-methylene-1,3-propanediol diacetate, $R^1$, $R^2$, $R^3$ and $R^4$ are a hydrogen atom, and $R^6$ and $R^7$ are a methyl group.

(IV)

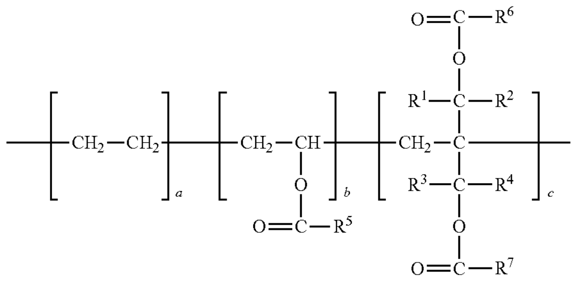

In Formula (IV), $R^1$, $R^2$, $R^3$, $R^4$, $R^5$, $R^6$, $R^7$, a, b and care as defined for Formulas (I) to (III). The modified ethylene-vinyl ester copolymer thus obtained is then saponified.

Instead of the unsaturated monomer represented by Formula (III), an unsaturated monomer represented by Formula (V) can be copolymerized, where by saponification process, only the units derived from the unsaturated monomer represented by Formula (II) are saponified.

(V)

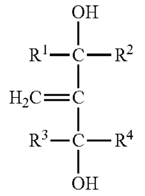

In Formula (V), $R^1$, $R^2$, $R^3$ and $R^4$ are as defined for Formula (I). An unsaturated monomer represented by Formula (V) is, for example, 2-methylene-1,3-propanediol.

Unsaturated monomers represented by Formulas (III) and (V) which are used in the present invention are highly copolymerizable with a vinyl ester monomer, so that copolymerization reaction is enhanced. Therefore, a modification amount and a polymerization degree of the obtained modified EVOH (A2) can be easily increased. Furthermore, if the polymerization reaction is stopped at a low polymerization ratio, the amount of the unreacted unsaturated monomer remaining at the end of polymerization is low, which is excellent in environmental and cost aspects. In this regard, the unsaturated monomers represented by Formulas (III) and (V) are superior to other monomers having only one carbon atom having a functional group at an allylic position such as allyl glycidyl ether and 3,4-diacetoxy-1-butene. Here, the unsaturated monomer represented by Formula (III) is more reactive than the unsaturated monomer represented by Formula (V).

A polymerization style for producing modified EVOH (A2) by copolymerizing ethylene and the vinyl ester represented by Formula (II) with the unsaturated monomer represented by Formula (III) or (V) can be any of batch polymerization, semi-batch polymerization, continuous polymerization and semi-continuous polymerization. Furthermore, a polymerization method can be a known method such as bulk polymerization, solution polymerization, suspension polymerization and emulsion polymerization. Bulk polymerization or solution polymerization in which polymerization is conducted in a solventless system or in a solvent such as an alcohol is usually employed. For the purpose of producing a modified ethylene-vinyl ester copolymer with a high polymerization degree, emulsion polymerization can be an alternative.

There are no particular restrictions to a solvent used in solution polymerization, and an alcohol is preferably used, and a lower alcohol such as methanol, ethanol and propanol is more preferably used. The amount of a solvent in a polymerization reaction liquid can be selected, taking a viscosity average polymerization degree of target modified EVOH (A2) and chain transfer of a solvent into account. A weight ratio of a solvent contained in the reaction liquid to the total monomers (solvent/total monomers) is selected from the range of 0.01 to 10, preferably 0.05 to 3.

A polymerization initiator used in copolymerizing ethylene and the vinyl ester represented by Formula (II) with the unsaturated monomer represented by Formula (III) or (V) is selected from known polymerization initiators such as azo initiators, peroxide initiators and redox initiators depending on a polymerization method. Examples of an azo initiator include 2,2'-azobisisobutyronitrile, 2,2'-azobis(2,4-dimethylvaleronitrile) and 2,2'-azobis(4-methoxy-2,4-dimethylvaleronitrile). Examples of a peroxide initiator include percarbonates such as diisopropyl peroxydicarbonate, di-2-ethylhexyl peroxydicarbonate and diethoxyethyl peroxydicarbonate; perester compounds such as t-butyl peroxyneodecanate, α-cumyl peroxyneodecanate and acetyl peroxide; acetylcyclohexylsulfonyl peroxide; and 2,4,4-trimethylpentyl-2-peroxyphenoxy acetate. The above initiator can be combined with, for example, potassium persulfate, ammonium persulfate or hydrogen peroxide. A redox initiator is a polymerization initiator in which, for example, the above peroxide initiator is combined with a reducing agent such as sodium bisulfite, sodium bicarbonate, tartaric acid, L-ascorbic acid and Rongalite. The amount of a polymerization initiator cannot be simply determined because it varies depending on the polymerization catalyst, and is adjusted in response to a polymerization rate. The amount of the polymerization initiator based on the vinyl ester monomer is preferably 0.01 to 0.2 mol %, more preferably 0.02 to 0.15 mol %. A polymerization temperature is suitably, but not limited to, room temperature to about 150° C., preferably 40° C. or higher and a boiling point of a solvent used or lower.

In copolymerizing ethylene and the vinyl ester represented by Formula (II) with the unsaturated monomer represented by Formula (III) or (V), copolymerization can be conducted in the presence of a chain transfer agent as long as the effects of the present invention are not impaired. Examples of a chain transfer agent include aldehydes such as acetaldehyde and propionaldehyde; ketones such as acetone and methyl ethyl ketone; mercaptans such as 2-hydroxyethane thiol; and phosphinates such as sodium phosphinate monohydrate. Among these, aldehydes and ketones are suitably used. The amount of the chain transfer agent to a polymerization reaction liquid can be determined, depending on a chain transfer constant of the chain transfer agent and a polymerization degree of the desired modified ethylene-vinyl ester copolymer, and generally, it is preferably 0.1 to 10 parts by mass based on 100 parts by mass of the vinyl ester monomer.

The modified ethylene-vinyl ester copolymer thus obtained can be saponified to afford a modified EVOH (A2) used in the present invention. Here, the vinyl ester units in the copolymer are converted into vinyl alcohol units. Furthermore, an ester bond derived from the unsaturated monomer represented by Formula (III) is concurrently hydrolyzed into a 1,3-diol structure. Thus, a single saponification reaction can concurrently hydrolyze different types of ester groups.

The modified ethylene-vinyl ester copolymer can be saponified by a known method. The saponification reaction can be generally conducted in an alcohol or an aqueous solution of an alcohol. Examples of an alcohol preferably used herein include lower alcohols such as methanol and ethanol, particularly preferably methanol. An alcohol or an aqueous alcohol used in the saponification reaction can contain other solvents such as acetone, methyl acetate, ethyl acetate and benzene as long as they are contained in 40% by weight or less. A catalyst used for the saponification is an alkali-metal hydroxide such as potassium hydroxide and sodium hydroxide; an alkaline catalyst such as sodium methylate; and an acidic catalyst such as a mineral acid. A saponification temperature is preferably, but not limited to, within the range of 20 to 120° C. When a gel-like product precipitates as the saponification proceeds, the product can be pulverized, rinsed and dried to afford a modified EVOH (A2).

The modified EVOH (A2) used in the present invention can contain a structural unit derived from another monomer which is copolymerizable with ethylene, the vinyl ester represented by Formula (II), and the unsaturated monomer represented by Formula (III) or (V) as long as the effects of the present invention are not impaired. A content of the other monomer units is preferably 5 mass % or less, more preferably 3 mass % or less, further preferably 1 mass % or less, particularly preferably substantially absent. Examples of such other monomers include α-olefins such as propylene, n-butene, isobutylene and 1-hexene; acrylic acid and salts thereof; unsaturated monomers having an acrylic ester group; methacrylic acid and salts thereof; unsaturated monomers having a methacrylic ester group; acrylamide, N-methylacrylamide, N-ethylacrylamide, N,N-dimethylacrylamide, diacetone acrylamide, acrylamidopropanesulfonic acid and salts thereof, acrylamidopropyldimethylamine and salts thereof (for example, quaternary salts); methacrylamide, N-methylmethacrylamide, N-ethylmethacrylamide, methacrylamidopropanesulfonic acid and salts thereof, methacrylamidopropyldimethylamine and salts thereof (for example, quaternary salts); vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether and 2,3-diacetoxy-1-vinyloxypropane; vinyl cyanides such as acrylonitrile and methacrylonitrile; vinyl halides such as vinyl chloride and vinyl fluoride; vinylidene halides such as vinylidene chloride and vinylidene fluoride; allyl compounds such as allyl acetate, 2,3-diacetoxy-1-allyloxypropane and allyl chloride; unsaturated dicarboxylic acid such as maleic acid, itaconic acid and fumaric acid, and salts or esters thereof; vinylsilane compounds such as vinyltrimethoxysilane; and isopropenyl acetate.

<PA (B)>

Specific examples of a PA (B) used in the present invention include polycaproamide (Nylon 6), poly-ω-aminoheptanoic acid (Nylon 7), poly-ω-aminononanoic acid (Nylon 9), polyundecaneamide (Nylon 11), polylauryl lactam (Nylon 12), polyethylenediamine adipamide (Nylon 26), polytetramethylene adipamide (Nylon 46), polyhexamethylene adipamide (Nylon 66), polyhexamethylene sebacamide (Nylon 610), polyhexamethylene dodecamide (Nylon 612), polyoctamethylene adipamide (Nylon 86), polydecamethylene adipamide (Nylon 106), caprolactam/lauryllactam copolymer (Nylon 6/12), caprolactam/ω-aminononanoic acid copolymer (Nylon 6/9), caprolactam/hexamethylene diammonium adipate copolymer (Nylon 6/66), lauryl lactam/hexamethylene diammonium adipate copolymer (Nylon 12/66), ethylene diammonium adipate/hexamethylenediammonium adipate copolymer (Nylon 26/66), caprolactam/hexamethylenediammonium adipate/hexamethylenediammonium sebacate copolymer (Nylon 6/66/610), ethylenediammonium adipate/hexamethylenediammonium adipate/hexamethylenediammonium sebacate copolymer (Nylon 26/66/610), polyhexamethylene isophthalamide (Nylon 6I), polyhexamethylene terephthalamide (Nylon 6T), hexamethylene isophthalamide/hexamethylene terephthalamide copolymer (Nylon 6I/6T), 11-aminoundecaneamide/hexamethylene terephthalamide copolymer, polynonamethylene terephthalamide (Nylon 9T), polydecamethylene terephthalamide (Nylon 10T), polyhexamethylene cyclohexylamide, polynonamethylene cyclohexylamide, and these polyamides modified with an aromatic amine such as methylenebenzylamine and metaxylenediamine. Metaxylylenediammonium adipate is also another example. Among these, in the light of particularly improving gas barrier properties and appearance after retorting process, a polyamide resin mainly made of caproamide is preferable. Specifically, it is preferable that 75 mol % or more of constituent units of PA (B) is a caproamide unit. Among others, in the light of compatibility with EVOH (A), PA (B) is preferably Nylon 6.

A polymerization degree of PA (B) is preferably 1.7 to 5.0, more preferably 2.0 to 5.0 as a relative viscosity as determined in accordance with JIS K6810.

PA (B) can be polymerized by melt polymerization, interfacial polymerization, solution polymerization, bulk polymerization, solid phase polymerization, and a combination thereof.

<Multivalent Metal Ions (C)>

The resin composition (x) preferably contains at least one type of multivalent metal ions (C) selected from the group consisting of magnesium ions, calcium ions and zinc ions in 20 to 400 ppm. Since the multilayer structure of the present invention has an inorganic barrier layer (Y) made of an inorganic material such as aluminum, alumina and silica, the inorganic material may promote a cross-linking reaction of the resin during melt molding of the pulverized product, resulting in thickening or gelation, but a certain amount of polyvalent metal ions (C) contained suppresses thickening, gelation and adhesion of the resin to the screw. In particular, the resin composition (x) preferably contains magnesium ions or calcium ions, more preferably magnesium ion as the multivalent metal ions (C).

Furthermore, the multivalent metal ions (C) are preferably contained as a carboxylic acid salt or hydroxide, more preferably as a hydroxide in the light of handleability during production. The carboxylic acid can be either an aliphatic carboxylic acid or an aromatic carboxylic acid, preferably an aliphatic carboxylic acid. Examples of an aliphatic carboxylic acid include formic acid, acetic acid, propionic acid, butyric acid, lauric acid, stearic acid, myristic acid, behenic acid and montanic acid. Among these, acetic acid is preferable in the light of availability, improvement of thermal stability during melt molding of a pulverized product of the obtained multilayer structure, and prevention of generation of hard spots. The multivalent metal ions (C) can be contained as a salt of a polycarboxylic acid described later.

For effectively preventing thickening of the resin composition (x), gelation and adhesion of the resin to a screw, a content of the multivalent metal ions (C) is more preferably 40 ppm or more, further preferably 100 ppm or more. When a proportion of PA (B) in the resin composition (x) is relatively higher, a content of the multivalent metal ions (C) may be preferably 130 ppm or more. Meanwhile, for preventing excessive decomposition of a pulverized product of the obtained multilayer structure and improving hue of the recovered composition, a content of the multivalent metal ions (C) is more preferably 300 ppm or less, further preferably 200 ppm or less. When a proportion of PA (B) in the resin composition (x) is relatively lower, a content of the multivalent metal ions (C) may be preferably 160 ppm or less.

As long as the effects of the present invention are not impaired, the resin composition (x) can contain components other than a multivalent metal ion (C). Examples of the other components include an alkali metal ion, an alkaline earth metal ion and a transition metal ion other than the multivalent metal ion (C), a carboxylic acid (a monocarboxylic acid, multivalent carboxylic acid), a phosphoric acid compound, a boron compound, a pro-oxidant, an antioxidant, a plasticizer, a heat stabilizer (a melt stabilizer), a photo initiator, a deodorant, a UV absorber, an antistatic, a lubricant, a colorant, a filler, a desiccant agent, a filling agent, a pigment, a dye, a processing aid, a flame retardant and an antifogging agent. In particular, in the light of improving interlayer adhesiveness of the multilayer structure, it is preferable that alkali metal ions are contained. Furthermore, from the viewpoint that coloring during melt-molding of the resin composition (x) and a pulverized product of the multilayer structure containing the resin composition (x) can be suppressed, it is preferable that a carboxylic acid and/or a phosphoric acid compound are contained. A boron compound contained allows for controlling a melt viscosity of the resin composition (x) and a pulverized product of the multilayer structure containing the resin composition (x).

<Alkali Metal Ion>

The resin composition (x) preferably contains alkali metal ions. The lower limit of a content of alkali metal ions is preferably 100 ppm, more preferably 150 ppm. Meanwhile, the upper limit of a content of alkali metal ions is preferably 400 ppm, more preferably 350 ppm. If a content of alkali metal ions is less than 100 ppm, interlayer adhesiveness of the multilayer molded article containing a layer obtained by molding the resin composition (x) may be insufficient. Meanwhile, if a content of alkali metal ions is more than 400 ppm, coloration due to thermal deterioration may become a problem. Furthermore, a ratio of alkali metal ions to a carboxylic acid described later can be controlled to further improve melt moldability and coloration resistance for the obtained resin composition (x).

Examples of alkali metal ions include ions of lithium, sodium, potassium, rubidium and cesium, preferably ions of sodium or potassium in the light of industrial availability. In particular, potassium ions may be used to be successful at both hue of the resin composition (x) and interlayer adhesiveness of the barrier resin layer (X) to an adhesive resin layer when a coextruded film is formed as described below, in a higher level. These can be used alone or in combination of two or more.

Examples of an alkali metal salt which gives alkali metal ions include an aliphatic carboxylate, an aromatic carboxylate, a carbonate, a hydrochloride, a nitride, a sulfate, a phosphate and a metal complex of an alkali metal such as lithium, sodium and potassium. Among others, sodium acetate, potassium acetate, sodium phosphate and potassium phosphate are more preferable in the light of availability.

<Carboxylic Acid>

The resin composition (x) preferably contains a carboxylic acid. The lower limit of a content of the carboxylic acid is preferably 50 ppm, more preferably 100 ppm. Meanwhile, the upper limit of a content of the carboxylic acid is preferably 400 ppm, more preferably 350 ppm. When a content of the carboxylic acid is less than 50 ppm, coloration resistance may be insufficient. Meanwhile, if a content of the carboxylic acid is more than 400 ppm, interlayer adhesiveness may be insufficient or smell may become a problem. A content of the carboxylic acid can be determined by extracting 10 g of the resin composition (x) with 50 mL of pure water at 95° C. for 8 hours and then titrating the obtained extract. Here, a carboxylic acid which is present as a salt in the above extract is not considered as a content of the carboxylic acid in the resin composition (x). When the resin composition (x) contains an acidic compound other than the carboxylic acid, a contribution of these acidic compounds can be subtracted from a measured value by titration, to determine a content of the carboxylic acid in the resin composition (x).

pKa of the carboxylic acid is preferably 3.5 to 5.5. With pKa of the carboxylic acid being within the above range, pH buffering capacity of the obtained resin composition (x) is improved, so that melt moldability can be further improved and coloration by an acidic or basic substance can be further improved.

The carboxylic acid can be a univalent carboxylic acid. These can be used alone or in combination of two or more. A univalent carboxylic acid is a compound having an intramolecular carboxyl group. Examples of a univalent carboxylic acid with pKa of 3.5 to 5.5 and a boiling point of lower than 150° C. include, but not limited to, formic acid (pKa=3.77), acetic acid (pKa=4.76), propionic acid (pKa=4.85), and acrylic acid (pKa=4.25). As long as a boiling point is lower than 150° C., these carboxylic acids can further have a substituent such as a hydroxy group, an amino group and a halogen atom. Among these, acetic acid is preferable in the light of higher safety, good availability and good handleability.

The carboxylic acid can be a multivalent carboxylic acid. A multivalent carboxylic acid as the carboxylic acid may further improve coloration resistance at a high temperature of the resin composition (x) and coloration resistance of a melt-molded product of a pulverized product of the obtained multilayer structure. Furthermore, a multivalent carboxylic acid compound preferably has 3 or more carboxyl groups. Here, coloration resistance may be more effectively improved. A multivalent carboxylic acid is a compound having two or more intramolecular carboxyl groups. Here, it is preferable that at least one carboxyl group has pKa of 3.5 to 5.5. Examples include oxalic acid (pKa2=4.27), succinic acid (pKa1=4.20), fumaric acid (pKa2=4.44), malic acid (pKa2=5.13), glutaric acid (pKa1=4.30, pKa2=5.40), adipic acid (pKa1=4.43, pKa2=5.41), pimelic acid (pKa1=4.71), phthalic acid (pKa2=5.41), isophthalic acid (pKa2=4.46), terephthalic acid (pKa1=3.51, pKa2=4.82), citric acid (pKa2=4.75), tartaric acid (pKa2=4.40), glutamic acid (pKa2=4.07), and aspartic acid (pKa=3.90).

<Phosphoric Acid Compound>

The resin composition (x) can further contain a phosphoric acid compound. The lower limit of a content of the phosphoric acid compound is preferably 5 ppm in terms of phosphate radical. Meanwhile, the upper limit of a content of the phosphoric acid compound is preferably 100 ppm in terms of phosphate radical. With the phosphoric acid compound being contained within the range, coloration of the obtained resin composition (x) and a melt-molded product of a pulverized product of an obtained multilayer structure can be prevented and thermal stability thereof can be improved.

Examples of a phosphoric acid compound include various acids such as phosphoric acid and phosphorous acid and salts thereof. A phosphoric acid salt can be any of a monobasic phosphate, a dibasic phosphate and a tribasic phosphate. A cationic species in the phosphoric acid salt is preferably, but not limited to, an alkali metal and an alkaline earth metal. Among these, the phosphoric acid compound is preferably sodium dihydrogen phosphate, potassium dihydrogen phosphate, disodium hydrogen phosphate or dipotassium hydrogen phosphate.

<Boron Compound>

The resin composition (x) can further contain a boron compound. When a boron compound is contained, the lower limit of its content in the resin composition (x) is preferably 50 ppm, more preferably 100 ppm in terms of boron element. Meanwhile, the upper limit of a content of the boron compound in the resin composition (x) is preferably 400 ppm, more preferably 200 ppm in terms of boron element. With the boron compound being contained within the range, thermal stability during melt molding of the resin composition (x) and the pulverized product of the obtained multilayer structure may be improved and generation of gel and hard spots may be suppressed. Furthermore, drawdown resistance and neck-in resistance during film formation can be improved and mechanical properties of an obtained molded article can be improved. These effects are supposed to be due to occurrence of chelate interaction between EVOH (A) and a boron compound.

Examples of a boron compound include boric acid, boric acid esters, boric acid salts and boron hydrides. Specific examples include boric acids such as orthoboric acid ($H_3BO_3$), metaboric acid and tetraboric acid; boric acid esters such as trimethyl borate and triethyl borate; alkali metal salts and alkaline earth metal salts of the above boric acids, and boric acid salts such as borax. Among others, orthoboric acid is preferable.

<Hindered Phenolic Compound>

The resin composition (x) can further contain a hindered phenolic compound having an ester bond or an amide bond. When a hindered phenolic compound is contained, a content of the hindered phenolic compound in the resin composition (x) is preferably 1000 to 10000 ppm. With a content of 1000 ppm or more, coloring, thickening and gelation of the resin during melt-molding of a pulverized multilayer structure can be suppressed. A content of the hindered phenolic compound is more preferably 2000 ppm or more. On the other hand, with a content of the hindered phenolic compound of 10,000 ppm or less, coloring and bleedout derived from the hindered phenolic compound can be suppressed. A content of the hindered phenolic compound is more preferably 8000 ppm or less.

The hindered phenolic compound has at least one hindered phenol group. A hindered phenol group refers to a group in which a bulky substituent is bonded to at least one of the carbons adjacent to the carbon to which the hydroxy group of the phenol is bonded. The bulky substituent is preferably an alkyl group having 1 to 10 carbon atoms, more preferably a t-butyl group.

The hindered phenolic compound is preferably in a solid state around room temperature. In the light of suppressing bleedout of the compound, a melting point or softening temperature of the hindered phenolic compound is preferably 50° C. or higher, more preferably 60° C. or higher, still more preferably 70° C. or higher. From the same viewpoint, a molecular weight of the hindered phenolic compound is preferably 200 or more, more preferably 400 or more, still more preferably 600 or more. On the other hand, the molecular weight is generally 2000 or less. Furthermore, in the light of facilitating mixing with EVOH (A) and PA (B), a melting point or softening temperature of the hindered phenolic compound is preferably 200° C. or lower, more preferably 190° C. or lower, still more preferably 180° C. or lower.

The hindered phenolic compound has an ester bond or an amide bond. Examples of a hindered phenolic compound having an ester bond include an ester of an aliphatic carboxylic acid having a hindered phenol group with an aliphatic alcohol, and examples of a hindered phenolic compound having an amide bond include amides of an aliphatic carboxylic acid having a hindered phenol group with an aliphatic amine. In particular, the hindered phenolic compound preferably has an amide bond.

Specific structures of the hindered phenolic compound include pentaerythritol tetrakis[3-(3,5-di-tert-butyl-4-hydroxyphenyl) propionate, which is commercially available as Irganox 1010; stearyl 3-(3,5-di-tert-butyl-4-hydroxyphenyl)propionate which is commercially available as Irganox 1076; 2,2'-thiodiethyl bis[3-(3,5-di-tert-butyl-4-hydroxyphenyl) propionate] which is commercially available as Irganox 1035; octadecyl 3-(3,5-di-tert-butyl-4-hydroxyphenyl)propanoate which is commercially available as Irganox 1135; bis(3-tert-butyl-4-hydroxy-5-methylbenzenepropanoic acid) ethylene bis(oxyethylene) which is commercially available as Ilganox 245; 1,6-hexanediol bis[3-(3,5-di-tert-butyl-4-hydroxyphenyl) propionate] which is commercially available as Irganox 259; N,N'-hexamethylene bis[3-(3,5-di-tert-butyl-4-hydroxyphenyl)propanamide] which is commercially available as Irganox 1098. These compounds are available from BASF. In particular, preferred are N,N'-hexamethylene bis[3-(3,5-di-tert-butyl-4-hydroxyphenyl)propanamide] which is commercially available as Irganox 1098, and pentaerythritol tetrakis[3-(3,5-di-tert-butyl-4-hydroxyphenyl)propionate] which is commercially available as Irganox 1010, and the former is more preferable.

The resin composition (x) can further contain a thermoplastic resin other than EVOH (A) and PA (B). Examples of a thermoplastic resin other than EVOH (A) and PA (B) include various polyolefins (polyethylene, polypropylene, poly1-butene, poly4-methyl-1-pentene, ethylene-propylene copolymers, copolymers of ethylene with an $\alpha$-olefin having 4 or more carbon atoms, copolymers of a polyolefin with maleic anhydride, ethylene-vinyl ester copolymers, ethylene-acrylic acid ester copolymers, or modified polyolefins which are these polyolefins graft-modified with an unsaturated carboxylic acid or a derivative thereof, and so forth), various polyesters (polyethylene terephthalate, polybutylene terephthalate, polyethylene naphthalate and so forth), polyvinyl chloride, polyvinylidene chloride, polystyrene, polyacrylonitrile, polyurethane, polycarbonate, polyacetal, polyacrylate and modified polyvinyl alcohol resins. A content of the thermoplastic resin in the resin composition (x) is preferably less than 30% by mass, more preferably less than 10% by mass, further preferably 5 mass % or less, optionally 1 mass % or less.

There are no particular restrictions to a method for producing the resin composition (x), and it can be produced by melt-kneading EVOH (A) and PA (B), and if necessary, other components and additives such as multivalent metal ions (C). The multivalent metal ions (C) can be blended in a solid state such as powder or as a molten material, or blended as a solute in a solution or a dispersoid in a dispersion. A solution and a dispersion are suitably an aqueous solution and an aqueous dispersion, respectively. Melt-kneading can be conducted using a known mixing or kneading device such as a kneader ruder, an extruder, a mixing roll and a Banbury mixer. A temperature range during melt-kneading can be appropriately adjusted depending on a melting point of EVOH (A) and PA (B) used or the like, it is generally 190 to 250° C.

In one embodiment of the present invention, a barrier resin layer (X) is a monolayer film formed by using the resin composition (x) as a main component. There are no particular restrictions to a method for forming such a layer, and generally, a film is formed by melt extrusion with an extruder. A barrier resin layer (X) can be a monolayer film having a thickness of 8 to 40 μm, or a biaxially oriented monolayer film having a thickness of 8 to 20 μm obtained by biaxially stretching the monolayer film. In particular, in the light of exhibiting gas barrier properties even with a relatively smaller thickness of the barrier resin layer (X) and improving gas barrier properties after retorting process of the multilayer structure obtained, it is preferable that the barrier resin layer (X) is a biaxially oriented monolayer film. There are no particular restrictions to a stretching method, and either simultaneous stretching or sequential stretching can be employed. In terms of a draw ratio, an area magnification is preferably 8 to 12 in the light of uniformity of a thickness, gas barrier properties and mechanical strength of a film obtained. An area magnification is preferably 12 times or less, more preferably 11 times or less. In terms of a draw ratio, an area magnification is preferably 8 times or more, more preferably 9 times or more. If an area magnification is less than 8 times, stretch spots may remain, while if it is more than 12 times, a film may be easily broken during stretching. Furthermore, a raw sheet before stretching can be preliminarily impregnated with water, to facilitate continuous stretching. A moisture content of the raw sheet before stretching is preferably 2% by mass or more, more preferably 5% by mass or more, further preferably 10% by mass or more. A moisture content of the raw sheet before stretching is preferably 30% by mass or less, more preferably 25% by mass or less, further preferably 20% by mass or less. If a moisture content is less than 2% by mass, stretch spots may remain, and especially when stretching in a width direction of the roll, a draw ratio of a part close to a grip holding the film becomes high, so that tearing is likely to occur near the grip. If a moisture content is more than 30% by mass, an elastic modulus of the stretched part is low, and a difference from a non-stretched part is not sufficient, so that stretch spots may remain. A temperature during stretching varies depending on a moisture content of the raw sheet before stretching, and it is generally within a temperature range of 50° C. to 130° C. In particular, in simultaneous biaxial stretching, a biaxially oriented monolayer film having few stretch spots can be obtained at a temperature within the range of 70° C. to 100° C. In a sequential biaxial stretching, temperature within the range of 70° C. to 100° C. for stretching in the longitudinal direction of the roll and of 80° C. to 120° C. for stretching in the width direction of the roll can give a biaxially oriented monolayer film with few stretch spots.

In another embodiment of the present invention, a barrier resin layer (X) is also preferably one layer of a coextruded film composed of two or more layers including the barrier resin layer (X). Layers other than the barrier resin layer (X) of the coextruded film are preferably composed of a layer containing a resin other than the resin composition (x) as a main component. The resin can be, for example, selected from those listed as a thermoplastic resin which can be contained in the resin composition (x), other than EVOH (A) and PA (B). In the light of gas barrier properties after retorting process of the multilayer structure obtained, excellent appearance and excellent recyclability of the multilayer structure obtained, a layer containing a polypropylene resin as a main component is more preferred, and a layer made of a polypropylene resin alone is further preferred. The polypropylene resin in the co-extruded film can be either an unmodified polypropylene resin or a modified polypropylene resin. Examples of an acid-modified polypropylene resin include resins obtained by modifying a polypropylene resin with maleic acid, fumaric acid, itaconic acid, maleic anhydride, itaconic anhydride or the like. The acid-modified polypropylene resin can be used as a polypropylene adhesive resin.

There are no particular restrictions to a method for forming a coextruded film, and it is generally formed by a melt molding method in which melt extrusion is conducted by an extruder. Here, a thickness of the coextruded film is preferably 8 to 120 μm, and a thickness of the barrier resin layer (X) is preferably 1 to 20 μm. When the coextruded film is formed by biaxially stretching, a thickness of the coextruded film is preferably 8 to 60 μm, and a thickness of the barrier resin layer (X) is preferably 0.5 to 10 μm, more preferably 1 to 10 μm. There are no particular restrictions to a stretching method, and both simultaneous stretching and sequential stretching can be employed. In terms of a draw ratio, an area magnification is preferably 8 to 60 times in the light of uniformity in a thickness and mechanical strength of the obtained film. The area magnification is preferably 55 times or less, more preferably 50 times or less. In terms of a draw ratio, the area magnification is preferably 8 times or more, more preferably 9 times or more. If the area magnification is less than 8 times, stretch spots may remain, while if it is more than 60 times, a film may be easily broken during stretching.

<Inorganic Barrier Layer (Y)>

In the multilayer structure of the present invention, at least one inorganic barrier layer (Y) with a thickness of 500 nm or less must be adjacent to the barrier resin layer (X). An inorganic barrier layer means a layer made of an inorganic substance such as a metal and a metal oxide, which has shielding property to oxygen, moisture, water during retorting process, or the like. With the inorganic barrier layer (Y) adjacent to the barrier resin layer (X), permeation of oxygen from fine defects of the inorganic barrier layer (Y) can be effectively suppressed, and thus, the multilayer structure of the present invention exhibits excellent gas barrier properties even after retorting process or after bending process. With the inorganic barrier layer (Y) with a thickness of 500 nm or less, a pulverized product of the multilayer structure of the present invention can exhibit excellent viscosity stability during melt molding, while generation of gel and hard spots are inhibited. The inorganic barrier layer (Y) is preferably either a metal vapor-deposited layer (Y1) containing aluminum as a main component, or an inorganic oxide vapor-deposited layer (Y2) containing alumina or silica as a main component. In the light of imparting shield property, a metal vapor-deposited layer (Y1) is preferable, whereas in the light of visibility of a content as a packaging material and capability of inhibiting generation of gel and hard spots during melt molding of a pulverized product, an inorganic oxide vapor-deposited layer (Y2) is preferable.

<Metal Vapor-Deposited Layer (Y1)>

A metal vapor-deposited layer (Y1) is a layer containing aluminum as a main component. A content of aluminum atoms in the metal vapor-deposited layer (Y1) must be 50 mol % or more, preferably 70 mol % or more, more preferably 90 mol % or more, still more preferably 95 mol % or more. At least one metal vapor-deposited layer (Y1) must be adjacent to the barrier resin layer (X). An average thickness of the metal vapor-deposited layer (Y1) is preferably 120 nm or less, more preferably 100 nm or less, even more preferably 90 nm or less. An average thickness of the metal vapor-deposited layer (Y1) is preferably 25 nm or more, more preferably 35 nm or more, further preferably 45 nm or more. An average thickness of the metal vapor-deposited layer (Y1) is an average value of the thicknesses at any 10 points of the cross section of the metal vapor-deposited layer (Y1) as measured by an electron microscope. In the light of reducing coloring of a recovered composition of the multilayer structure, when the multilayer structure has a plurality of metal vapor-deposited layers (Y1), the total thickness of the metal vapor-deposited layers (Y1) is preferably 1 μm or less. When the multilayer structure of the present invention has the metal vapor-deposited layer (Y1), a light transmittance at a wavelength of 600 nm can be 10% or less, which means excellent shading performance.

<Inorganic Oxide Vapor-Deposited Layer (Y2)>

Examples of an inorganic oxide vapor-deposited layer (Y2) include vapor deposited films of an inorganic oxide such as oxides of silicon, aluminum, magnesium, calcium, potassium, tin, sodium, boron, titanium, lead, zirconium and yttrium, preferably alumina or silica. An average thickness of the inorganic oxide vapor-deposited layer (Y2) is preferably 90 nm or less, more preferably 70 nm or less, further preferably 50 nm or less. An average thickness of the inorganic oxide vapor-deposited layer (Y2) is preferably 10 nm or more, more preferably 15 nm or more, further preferably 20 nm or more. An average thickness of the inorganic oxide vapor-deposited layer (Y2) is an average value of the thicknesses at any 10 points of the cross section of the inorganic oxide vapor-deposited layer (Y2) as measured by an electron microscope. When the multilayer structure of the present invention has an inorganic oxide vapor-deposited layer (Y2), a light transmittance at a wavelength of 600 nm can be 80% or more, which means excellent visibility of a content as a packaging material. In the light of further improving visibility, a light transmittance at a wavelength of 600 nm is more preferably 90% or more.

The inorganic barrier layer (Y) can be deposited by known physical vapor deposition or chemical vapor deposition. Specific examples include vacuum vapor deposition, sputtering, ion plating, ion beam mixing, plasma CVD, laser CVD, MO-CVD and thermal CVD, preferably physical vapor deposition, and among these, particularly preferably vacuum vapor deposition. Here, as long as the effects of the present invention are not impaired, a protective layer (topcoat layer) can be, if necessary, formed over the inorganic barrier layer (Y). The upper limit of a surface temperature of a substrate during film deposition is preferably 60° C., more preferably 55° C., further preferably 50° C. The lower limit of a surface temperature of a substrate during film deposition is preferably, but not limited to, 0° C., more preferably 10° C., further preferably 20° C. Before the film deposition, the surface of the substrate can be plasma-treated. The plasma treatment can be a known method, preferably atmospheric pressure plasma treatment. In the atmospheric pressure plasma treatment, a discharge gas used is nitrogen, helium, neon, argon, krypton, xenon, radon or the like. Among these, nitrogen, helium, and argon are preferably used, and nitrogen is particularly preferable because a cost can be reduced.

<Multilayer Structure>

A layer configuration of the multilayer structure of the present invention is a multilayer structure at least having a barrier resin layer (X) made of a resin composition (x) containing EVOH (A) and PA (B), and an inorganic barrier layer (Y), wherein at least one pair of the barrier resin layer (X) and the inorganic barrier layer (Y) must be adjacent to each other. Furthermore, in the light of improving appearance and gas barrier properties after retorting process, it is preferable that at least one barrier resin layer (X) is outer than the inorganic barrier layer (Y).

<Outer Layer and Inner Layer>

The multilayer structure of the present invention preferably has an outer layer and an inner layer, which contain a polypropylene resin as a main component. Since a polypropylene resin exhibits excellent heat resistance, mechanical properties and heat sealability, and is economically available, a multilayer structure having layers containing a polypropylene resin as a main component as an outer layer and an inner layer is preferably used as a packaging material for a retort. The polypropylene resin used for the outer layer and the inner layer can be the same or different from each other. Examples of a polypropylene resin include polypropylene; a propylene copolymer prepared by copolymerizing propylene with an α-olefin such as ethylene, 1-butene, 1-hexene and 4-methyl-1-pentene. Furthermore, other examples of a polypropylene resin include a graft-modified polypropylene prepared by graft-modifying these with an acid and a propylene copolymer prepared by copolymerizing propylene with an acid. A propylene unit content in the propylene copolymer is preferably 50 mol % or more, more preferably 70 mol % or more, further preferably 90 mol % or more. Furthermore, a content of the polypropylene resin in the outer layer and the inner layer is preferably 50 mass % or more, more preferably 70 mass % or more, further preferably 90 mass % or more, respectively.

A melting point of the polypropylene resin used for the outer layer and the inner layer is preferably 140° C. or higher and lower than 170° C., and preferably, at least one melting point is 150° C. or higher and lower than 170° C., and more preferably both melting points are 150° C. or higher and lower than 170° C. With a melting point within the above range, heat sealability and retort resistance of a multilayer structure obtained are improved, and when the multilayer structure is pulverized and then melt-molded, it is excellent in uniformity. An MFR (melt flow rate: 210° C., under a load of 2.16 kg) of the polypropylene resin is generally 0.5 to 50 g/10 min. With an MFR of the polypropylene within the above range, melt moldability of the polypropylene resin and the pulverized multilayer structure containing the polypropylene resin is improved. In the present invention, an MFR of a resin is measured in accordance with JIS K 7210:2014. A density of the polypropylene is usually 0.88 to 0.93 g/$cm^3$.

The outer layer and the inner layer can be films formed using the polypropylene resin as a main component, respectively. There are no particular restrictions to a method for forming a film of such a layer, and it is generally formed by melt extrusion with an extruder. The outer layer and the inner layer can be either a non-oriented film, a uniaxially oriented film, or a biaxially oriented film, and in the light of improving mechanical strength, the outer layer is preferably a biaxially oriented film and in the light of improving the heat sealability, the inner layer is preferably a non-oriented film. There are no particular restrictions to a stretching method, which can be simultaneous stretching or sequential stretching. In terms of a draw ratio, it is preferable in the light of thickness uniformity and mechanical strength of a film obtained that an area magnification is 8 to 60 times. The area magnification is preferably 55 times or less, more preferably 50 times or less. In terms of a draw ratio, an area magnification is preferably 8 times or more, more preferably 9 times or more. If the area magnification is less than 8 times, stretch spots may remain, while if it is more than 60 times, a film may be easily broken during stretching.

A thickness of the outer layer and of the inner layer is preferably 20 to 150 μm in the light of industrial productivity. Specifically, a thickness of a non-oriented film is more preferably 20 to 150 μm, and a thickness of a biaxially oriented film is more preferably 20 to 60 μm.

A thickness of each layer in a multilayer structure of the present invention can be appropriately adjusted depending on an intended use, and in the light of inhibiting coloration during melt molding a pulverized product, improving thermal stability during melt molding and inhibiting generation of hard spots, a ratio of the total thickness of layers containing a polypropylene resin as a main component to the total thickness of the multilayer structure is preferably 0.75 or more, more preferably 0.85 or more. In the light of improving gas barrier properties, the ratio is preferably 0.98 or less.

The total thickness of the multilayer structure of the present invention is preferably 200 μm or less. With the total thickness within the above range, the multilayer structure of the present invention is lightweight and flexible, so that it is suitably used for soft packaging. In addition, the amount of resin used in the multilayer structure is small, and thus the environmental burden is reduced.

Preferably, the multilayer structure of the present invention does not comprise a layer comprising a resin having a melting point of lower than 140° C. as a main component, a layer comprising a resin having a melting point of 240° C. or higher as a main component, nor a metal layer with a thickness of 1 μm or more. Without a layer comprising a resin having a melting point of lower than 140° C. as a main component, problems of deformation, whitening and interlayer peeling by retorting process can be prevented. Meanwhile, without a layer comprising a resin having a melting point of 240° C. or higher as a main component and a metal layer with a thickness of 1 μm or more, uneven mixing with other components during melt molding of a pulverized multilayer structure can be prevented. Here, a metal layer is a layer having a continuous surface and a discontinuous surface made of a metal such as aluminum foil.

In the multilayer structure of the present invention, an oxygen transmission rate (at 20° C. and 65% RH) after retorting process at 125° C. for 60 min is preferably less than 10 cc/($m^2$·day·atm), more preferably less than 5 cc/($m^2$·day·atm), particularly preferably less than 2 cc/($m^2$·day·atm). With an oxygen transmission rate within the above range, the multilayer structure has excellent gas barrier properties.

Each layer constituting the multilayer structure of the present invention can be laminated, if necessary, via an adhesive layer. The adhesive layer can be formed by applying a known adhesive and then drying it. The adhesive is preferably a two-component reaction type polyurethane adhesive in which a polyisocyanate component and a polyol component are mixed and reacted. A thickness of the adhesive layer is, but not limited to, preferably 1 to 5 μm, more preferably 2 to 4 μm.

The multilayer structure of the present invention can have layers other than those described above as long as the effects of the present invention are not impaired. The other layer can be, for example, a printed layer. The printed layer can be contained at any position in the multilayer structure of the present invention. An example of the printed layer is a film obtained by applying a solution containing a pigment or dye and, if necessary, a binder resin, and then drying the film. Examples of a method for applying a printed layer include various coating methods using a wire bar, a spin coater, a die coater, or the like, in addition to a gravure printing method. A thickness of the ink layer is, but not limited to, preferably 0.5 to 10 μm, more preferably 1 to 4 μm.

It is preferable to reuse a recovered material (scrap) obtained by recovering end cuts and defective products generated in manufacturing the multilayer structure of the present invention. A method for recovering a multilayer structure comprising pulverizing the multilayer structure of the present invention followed by melt-molding, and a recovered composition containing a recovered material of the multilayer structure of the present invention are also preferred embodiments of the present invention.

When recovering the multilayer structure of the present invention, a recovered material of the multilayer structure of the present invention is first pulverized. The pulverized recovered material can be melt-molded as it is to obtain a recovered composition, or if necessary, melt-molded together with other components to obtain a recovered composition. A preferable component which can be added to the recovered material is, for example, a polypropylene resin. The polypropylene resin can be any of those described above as used in the multilayer structure of the present invention. The pulverized recovered material can be directly used for manufacturing a molded article such as a multilayer structure. Alternatively, the pulverized recovered material can be melt-molded to obtain pellets composed of the recovered composition, and then the pellets can be used for manufacturing a molded article.

A mass ratio of the resin composition (x) to a polypropylene resin [resin composition (x)/polypropylene resin] in the recovered composition is preferably 1/99 to 30/70. If the mass ratio is less than 1/99, a usage ratio of the recovered material may decrease. Meanwhile, if the mass ratio exceeds 30/70, melt moldability and mechanical properties of the recovered composition may be deteriorated.

The multilayer structure of the present invention is preferably used as a packaging material for a retort because it has excellent gas barrier properties and excellent appearance even after stretching process or retorting process followed by bending process. In addition, the multilayer structure of the present invention is excellent in uniformity when being melt-molded after pulverizing, and hard spots and coloring are suppressed, so that a packaging material for retort which is highly applicable to post-consumer recycling can be provided.

EXAMPLES

There will be further specifically described the present invention with reference to EXAMPLES.

(1) Oxygen Transmission Rate Before Retorting Process

Using the multilayer structures obtained in Examples and Comparative Examples, an oxygen transmission rate was measured where the outer layer was the oxygen supply side while the inner layer was the carrier gas side. Specifically, using an oxygen transmission measuring device ("MOCON OX-TRAN2/21" manufactured by Modern Controls Inc.), an oxygen transmission rate (unit: cc/($m^2$·day·atm)) was measured under the conditions: temperature: 40° C., humidity of the oxygen supply side: 90% RH, humidity of the carrier gas side: 0% RH, oxygen pressure: 1 atm and carrier gas pressure: 1 atm. A carrier gas was nitrogen gas containing 2% by volume of hydrogen gas. The results were evaluated on a 5-grade scale of A to E below.

Criteria

A: less than 0.1 cc/($m^2$·day·atm)

B: 0.1 cc/($m^2$·day·atm) or more and less than 0.25 cc/($m^2$·day·atm)

C: 0.25 cc/($m^2$·day·atm) or more and less than 0.5 cc/($m^2$·day·atm)

D: 0.5 cc/($m^2$·day·atm) or more and less than 1 cc/($m^2$·day·atm)

E: 1 cc/($m^2$·day·atm) or more (2) Oxygen Transmission Rate Before Retorting Process and after Stretching Process A multilayer structure obtained in each of Examples and Comparative Examples was cut out in A4 size (a flow direction is longitudinal), then stretched 5% in a longitudinal direction for 30 sec, and held in a stretched state for 5 min. For the multilayer structure after stretching process, an oxygen transmission rate was determined where the outer layer was an oxygen supply side and the inner layer was a carrier gas side. Specifically, it was determined as described in (1), and the results were evaluated according to the same criteria.

(3) Oxygen Transmission Rate after Retorting Process

Two multilayer structures obtained in each of Examples and Comparative Examples were cut out in A4 size, and then the inner layer sides were overlaid such that these faced each other, and the three sides were heat-sealed to prepare a pouch. Next, 800 g of water was charged through the opening of the pouch, and the opening was heat-sealed to prepare a pouch filled with water. This was retorted at 125° C. for 60 minutes using a retort device (high-temperature high-pressure cooking sterilization tester "RCS-40RTGN" manufactured by Hisaka Works, Ltd.). After the retorting process, the water on the surface of the pouch was wiped off, and the pouch was left in a thermo-hygrostat chamber at 20° C. and 65% RH for 3 hours. Then, the pouch was opened to remove water, and then an oxygen transmission rate was measured where the outer layer was an oxygen supply side and the inner layer was a carrier gas side. Specifically, using an oxygen transmission measuring device ("MOCON OX-TRAN2/21" manufactured by Modern Controls Inc.), an oxygen transmission rate (unit: cc/($m^2$·day·atm)) was measured under the conditions: temperature: 20° C., humidity of the oxygen supply side: 65% RH, humidity of the carrier gas side: 65% RH, oxygen pressure: 1 atm and carrier gas pressure: 1 atm. A carrier gas was nitrogen gas containing 2% by volume of hydrogen gas. Measured values 24 hours after initiation of measurement were used as criteria for judgment, and the results were evaluated on a 5-grade scale of A to E below.

Criteria

A: less than 2 cc/($m^2$·day·atm)

B: 2 cc/($m^2$·day·atm) or more and less than 5 cc/($m^2$·day·atm)

C: 5 cc/($m^2$·day·atm) or more and less than 10 cc/($m^2$·day·atm)

D: 10 cc/($m^2$·day·atm) or more and less than 20 cc/($m^2$·day·atm)

E: 20 cc/($m^2$·day·atm) or more (4) Oxygen Transmission Rate after Bending Process after Retorting Process A multilayer structure obtained in each of Examples and Comparative Examples was subjected to retorting process as described in (3). After retorting process, water was wiped out from a pouch surface, and the pouch was placed in a thermo-hygrostat chamber at 23° C. and 50% RH for 3 hours and then the pouch was opened for removing water, and was subjected to bending process using Gelbo Flex Tester (Rigaku Kogyo). Specifically, first the multilayer structure after retorting process was formed into a hollow cylinder with a diameter of 3.5 inches, whose ends were gripped while it was twisted at the initial 3.5 inches of the stroke by an angle of 440° with an initial grip interval of 7 inches, and a grip interval at the maximum bending of 1 inch, and then at 2.5 inches was subjected to straight horizontal movement, and a reciprocating motion consisting of the movement were repeated 10 times at a speed of 40 times/min. For the multilayer structure after bending process, an oxygen transmission rate was determined where the outer layer was an oxygen supply side and the inner layer was a carrier gas side. Specifically, it was determined as described in (3), and the results were evaluated according to the same criteria.

(5) Appearance after Retorting Process

A multilayer structure obtained in each of Examples and Comparative Examples was subjected to retorting process as described in (3). After retorting process, water on the surface of the pouch was wiped off, and the pouch was left in a thermo-hygrostat chamber at 20° C. and 65% RH for 3 hours. Then, appearance of the pouch was evaluated in accordance with the following four-level criteria of A to D.

Criteria

A: Change in appearance was not substantially observed compared to before the retorting process.

B: Mild whitening, discoloration, and deformation were observed.

C: Moderate whitening, discoloration, and deformation were observed, or partial delamination was observed.

D: Severe whitening and deformation were observed, or widespread delamination was observed.

(6) Light Transmittance Before and After Retorting Process

For a multilayer structure obtained in each of Examples and Comparative Examples, a light transmittance at a wavelength of 600 nm was measured using an ultraviolet visible spectrophotometer "UV-2450" manufactured by Shimadzu Corporation. Then, as described in (3), retorting process was conducted. After retorting process, water on the surface of the pouch was wiped off, and the pouch was placed in a thermo-hygrostat chamber at 20° C. and 65% RH for 3 hours. For the multilayer structure after retorting process thus obtained, a light transmittance was also determined as described above. The measurement results were evaluated in accordance with the following four-level criteria of A to D. Criteria A and B indicate that the multilayer structure can be suitably used for an application requiring transparency and visibility of the content. Criterion D indicates that the multilayer structure can be suitably used for an application requiring shading performance.

Criteria

A: a light transmittance at 600 nm is 90% or more

B: a light transmittance at 600 nm is 80% or more and less than 90%

C: a light transmittance at 600 nm is 10% or more and less than 80%

D: a light transmittance at 600 nm is less than 10%

(7) Hard Spots and Coloring of a Melt-Molded Product of a Pulverized Multilayer Structure A multilayer structure obtained in each of Examples and Comparative Examples was pulverized to a size of 4 mm square or less. This pulverized product and a polypropylene resin ("Novatec PP EA7AD" manufactured by Japan Polypropylene Corporation (density: 0.90 g/cc, MFR (230° C., under a load of 2.16 kg): 1.4 g/10 min) were blended in a mass ratio (pulverized product/polypropylene resin) of 40/60 and used for monolayer-film formation under the following extrusion conditions, to give a monolayer film with a thickness of 50 μm. A thickness of the monolayer film was adjusted by appropriately changing a screw rotation speed and a winding roll speed. Using a polypropylene resin alone, a monolayer film with a thickness of 50 μm as a control was prepared as described above.

Extruder: Single screw extruder manufactured by Toyo Seiki Seisakusho, Ltd.

Screw diameter: 20 mmφ (L/D=20, compression ratio=3.5, full-flight type)

Extrusion temperature: feeding zone/compression zone/metering zone/die=230/230/230/230° C.

Winding roll temperature: 80° C.

Status of hard spots and coloring of the obtained monolayer film was evaluated in accordance with the four-level criteria of A to D.

Criteria for Hard Spots

A: Compared to the control, the amount of hard spots was almost the same.

B: Compared to the control, the amount of small hard spots was slightly larger.

C: Compared to the control, the amount of small hard spots was larger.

D: Compared to the control, the amount of large hard spots was larger.

Criteria for Coloring

A: Compared to the control, a degree of hue change was small

B: Compared to the control, slight coloring was observed

C: Compared to the control, moderate coloring was observed

D: Compared to the control, significant coloring was observed and furthermore, unevenness was observed.

(8) Melt Viscosity Stability of a Pulverized Multilayer Structure

A multilayer structure obtained in each of Examples and Comparative Examples was pulverized to a size of 4 mm square or less. A torque change when 60 g of this pulverized product was kneaded using a labo plastmill (biaxially different directions) under nitrogen atmosphere at 230° C. and 100 rpm was measured. Torque values (TI and TF, respectively) 10 minutes and 90 minutes after the start of kneading were calculated and evaluated by a ratio (TF/TI) of these values in accordance with the following four-level criteria of A to D.

Criteria

A: 80/100 or more and less than 120/100

B: 60/100 or more and less than 80/100, or 120/100 or more and less than 140/100

C: 40/100 or more and less than 60/100, or 140/100 or more and less than 160/100

D: Less than 40/100 or 160/100 or more

[Preparation Example of a Resin Composition]

(1) Synthesis of EVAc

In a 250 L high-pressure reaction tank equipped with a jacket, a stirrer, a nitrogen inlet, an ethylene inlet and an initiator addition port, 100 kg of vinyl acetate, 10 kg of methanol and 2.9 kg of 2-methylene-1,3-propanediol diacetate were charged, and the mixture was heated to 60° C. followed by nitrogen bubbling for 30 min, to replace the atmosphere of the reaction tank with nitrogen. Then, ethylene was introduced such that a reaction tank pressure (ethylene pressure) became 4.9 MPa. After a temperature in the reaction tank was adjusted to 60° C., a solution of 36 g of 2,2'-azobis(2,4-dimethylvaleronitrile) ("V-65", from Wako Pure Chemical Corporation) as an initiator in methanol was added to initiate polymerization. During the polymerization, an ethylene pressure and a polymerization temperature were maintained at 4.9 MPa and 60° C., respectively. After 6 hours, a polymerization ratio of vinyl acetate reached 45% and then the mixture was cooled to terminate the polymerization. The reaction tank was opened to expel ethylene followed by nitrogen gas bubbling, to completely expel ethylene. Subsequently, unreacted vinyl acetate was removed under reduced pressure, and then methanol was added to the modified ethylene-vinyl acetate copolymer (hereinafter, sometimes referred to as "modified EVAc") to which a structural unit derived from MPDAc by copolymerization, to prepare a 20% by mass methanol solution.

(2) Saponification of EVAc

In a 500 L reaction tank equipped with a jacket, a stirrer, a nitrogen inlet, a reflux condenser and a solution addition port, a 20% by mass solution of the modified EVAc in methanol prepared in (1) was charged. While bubbling nitrogen into the solution, the solution was heated to 60° C., and 0.5 equivalents of sodium hydroxide based on vinyl acetate unit in the modified EVAc was added as a 2 N methanol solution. After addition of the solution of sodium hydroxide in methanol, the mixture was stirred for 2 hours while a reaction system temperature was kept at 60° C., to let saponification reaction proceed. Then, acetic acid was added for terminating the saponification reaction. Then, while the mixture was stirred under heating at 60 to 80° C., ion-exchange water was added and methanol was distilled off out of the reaction tank, to precipitate a modified EVOH. The precipitated modified EVOH was collected and pulverized by a mixer. The modified EVOH powder thus obtained was then added to a 1 g/L aqueous solution of acetic acid (bath ratio: 20; 20 L of the aqueous solution/1 kg of the powder) and the mixture was washed with stirring for 2 hours. This was deliquored and further added to a 1 g/L aqueous solution of acetic acid (bath ratio: 20) and was washed with stirring for 2 hours. This was deliquored, the residue was added to ion-exchange water (bath ratio: 20) and washed with stirring for 2 hours followed by deliquoring. This process was repeated three times for purification. The product was immersed with stirring in 10 L of an aqueous solution containing 0.5 g/L of acetic acid and 0.1 g/L of sodium acetate for 4 hours and was deliquored. The product was dried at 60° C. for 16 hours, to give a crude dried modified EVOH.

(3) Production of Water-Containing Modified EVOH Pellets

In an 80 L stirring tank equipped with a jacket, a stirrer and a reflux condenser, the crude dried modified EVOH obtained in (2), water and methanol were charged, and the mixture was heated to 80° C. for dissolution. This solution was extruded through a tube with a diameter of 4 mm into a mixed solution of water/methanol=90/10 cooled to 5° C. to precipitate a strand, which was then cut by a strand cutter into pellets, that is, water-containing pellets of the modified EVOH. A moisture content of the water-containing pellet of the modified EVOH obtained was determined to be 60% by mass as measured by a halogen moisture analyzer "HR73" from Mettler Toledo.

(4) Production of Pellets of a Modified EVOH Composition

The water-containing pellets of the modified EVOH obtained in (3) were added to a 1 g/L aqueous solution of acetic acid (bath ratio: 20) and washed with stirring for 2 hours. This was deliquored, and then charged into a 1 g/L aqueous solution of acetic acid (bath ratio: 20), and the mixture was washed with stirring for 2 hours. After deliquoring, the same procedure was repeated with a fresh aqueous solution of acetic acid. The product washed with aqueous solution of acetic acid and then deliquored was added to ion-exchange water (bath ratio: 20) and washed with stirring for two hours followed by deliquoring. This procedure was repeated three times for purification, to give water-containing pellets of the modified EVOH free from the catalyst residue generated during the saponification reaction. The water-containing pellets were added to an aqueous solution of sodium acetate (concentration: 0.5 g/L), acetic acid (concentration: 0.8 g/L), and phosphoric acid (concentration: 0.005 g/L) (bath ratio: 20), and immersed for 4 hours with periodic stirring. The pellets were deliquored, dried at 80° C. for 3 hours and then at 105° C. for 16 hours, to give pellets of a modified EVOH composition.

(5) Content Rate of Each Structural Unit and Saponification Degree of a Modified EVOH A modified EVAc and a modified EVOH after saponification were analyzed by $^1$H-NMR spectrometry as described in WO2014/024912A1 to determine a content rate of each structural unit of the modified EVOH [content rates of a, b and c in Formula (I)] and a saponification degree. The results are shown in Table 1.

(6) MFR of EVOH

For the pellets of the modified EVOH composition obtained in (4), an MFR was determined in accordance with JIS K7210 (1999) at a temperature of 210° C. and a load of 2160 g. The MFR was 4.0 g/10 min. Here, for the EVOH composition used in Examples and Comparative Examples in this specification, all MFRs were within the range of 3.5 to 4.5 g/10 min.

(7) Sodium Salt Content and Phosphate Compound Content in a Modified EVOH Composition 0.5 g of the pellets of the modified EVOH composition obtained in (4) was charged in a Teflon® pressure vessel, and 5 mL of concentrated nitric acid was added to the vessel to allow for decomposition at room temperature for 30 min. Thirty minutes later, a lid was put on the vessel, and the mixture was heated by a wet decomposition apparatus ("MWS-2" from ACTAC Co., Ltd.) at 150° C. for 10 min and then at 180° C. for 5 min for decomposition, and then cooled to room temperature. This process liquid was transferred to a 50 mL measuring flask (made of TPX) and diluted with pure water to the predetermined volume. This solution was analyzed for contained metals by an ICP emission spectrophotometer ("OPTIMA4300DV" from PerkinElmer Co., Ltd.), to determine contents of a sodium salt and a phosphate compound in the pellets of the modified EVOH composition. A sodium salt content was 150 ppm in terms of sodium element, and a phosphate compound content was 10 ppm in terms of phosphate radical. Here, for the EVOH composition used in Examples and Comparative Examples in this specification, a sodium salt content and a phosphate compound content were within the range of 140 to 160 ppm and 5 to 15 ppm, respectively.

(8) Preparation of a Resin Composition

A mixture of 85 parts by weight of the modified EVOH composition pellets obtained in (4), 15 parts by weight of Nylon 6 "SF1018A" pellets from Ube Industries, Ltd. (hereinafter, abbreviated as "PA6": a relative viscosity [ηr]: 3.0, a melting point: 221° C.) and powdered magnesium hydroxide (120 ppm in terms of magnesium ions) was fed to a twin-screw extruder "TEX30α" (screw diameter: 30 mm) manufactured by Japan Steel Works, Ltd. Using a screw having a forward staggered kneading disk with L (screw length)/D (screw diameter)=3, melt extrusion was conducted under the conditions of a melting temperature of 230 to 240° C. and an extrusion speed of 20 kg/hr, to give strands. The obtained strands were cooled and solidified in a cooling bath and then cut to provide resin composition pellets.

Example 1

[Formation of a Monolayer Film]

Using the resin compositions obtained above, monolayer-film formation was conducted under the extrusion conditions below, to give monolayer films with a thickness of 15 μm and 30 μm. A thickness of the monolayer film was adjusted by appropriately varying a screw rotation speed and a winding roll speed.

Extruder: Single screw extruder manufactured by Toyo Seiki Seisakusho

Screw diameter: 20 mmφ (L/D=20, compression ratio=3.5, full flight type)

Extrusion temperature: feeding zone/compression zone/metering zone/die=230/230/230/230° C.

Winding roll temperature: 80° C.

On one side of the monolayer film obtained, alumina was vapor-deposited to a thickness of 30 nm by a known vacuum vapor deposition method. Next, to one side of each of a biaxially oriented polypropylene film (TOYOBO Co., Ltd., "PYLEN Film-OT P2161", thickness: 30 μm) and a non-oriented polypropylene film (Mitsui Chemicals Tohcello, Inc., "RXC-22", thickness: 50 μm), a two-component type adhesive ("TakelacA-520" and "Takenate A-50" from Mitsui Chemicals Inc.) was applied such that a dry thickness of the adhesive was 2 μm, and dried. Hereinafter, sometimes an aluminum vapor deposition layer is abbreviated as AlOx, a biaxially oriented polypropylene film is abbreviated as BOPP, a non-oriented polypropylene film is abbreviated as CPP, and an adhesive layer is abbreviated as Ad.

Subsequently, the BOPP and the CPP coated with the adhesive and the monolayer film on which alumina was vapor-deposited were laminated to obtain a multilayer structure having a structure of (the outer layer side) BOPP30/Ad2/resin composition 15/AlOx/Ad2/CPP50 (the inner layer side). Here, the number in the symbol representing each layer represents a thickness in μm. Here, in the monolayer film on which alumina was vapor-deposited, the alumina-deposited layer was on the CPP side and the resin composition layer was on the BOPP side. Various evaluations in (1) to (8) above were performed using the multilayer structure. The results are shown in Table 3.

Examples 2 to 22, 26 to 28 and Comparative Examples 1 to 6

Multilayer structures were produced as described in Example 1, except that a composition of a resin composition and a layer configuration of a multilayer structure were changed as shown in Table 2. Examples 2 and 7 were produced substituting EVOH with an ethylene content of 38 mol % and a saponification degree of 99.95 mol % for a modified EVOH, and modified EVOHs in the other Examples and Comparative Examples were produced, changing polymerization conditions. Furthermore, when a multivalent metal ion was added as an acetate salt, it was fed to a twin-screw extruder as an aqueous solution, and a vacuum vent was placed downstream than a feeding zone to remove volatiles. The multilayer structure obtained was evaluated as described in Example 1. The evaluation results are shown in Table 3. Here, each layer used for the multilayer structures described in Table 2 was as follows.

BOPP30: a biaxially oriented polypropylene film (TOYOBO Co., Ltd., "PYLEN Film-OT P2161", melting point: 164° C., thickness: 30 μm)

CPP50: a non-oriented polypropylene film (Mitsui Chemicals Tohcello, Inc., "RXC-22", melting point: 166° C., thickness: 50 μm)

BOPET12: an oriented polyethylene terephthalate film (TORAY Industries, Inc., "Lumirror P60", melting point: 256° C., thickness: 12 μm)

PE50: a non-oriented polyethylene film (Mitsui Chemicals Tohcello, Inc., "T.U.X. HZR-2", melting point: 127° C., thickness: 50 μm)

VM: an aluminum metal vapor-deposited layer deposited by a known vacuum vapor deposition method AlOx: an alumina inorganic oxide vapor-deposited layer deposited by a known vacuum vapor deposition method SiOx: a silica inorganic oxide vapor-deposited layer deposited by a known vacuum vapor deposition method In Table 2, in view of a sequence of a vapor-deposited layer and a layer on which the layer is deposited, a configuration is expressed as, for example, "AlOx/resin composition" or "resin composition/AlOx". For example, in the multilayer structure of Example 1, the AlOx layer is laminated in the inner layer side and the resin composition layer is laminated in the outer layer side. Such an expression is also applied to other vapor-deposited layers. In Table 2, for a multilayer structure containing a coextruded film, a part composed of the coextruded film is described in parentheses as, for example, (PP90/resin composition 9). Here, "BO" means a biaxially oriented film.

Example 23

[Formation of a Biaxially Oriented Monolayer Film]

A monolayer film with a thickness of 135 μm was formed as described in Example 1, except that a screw rotation speed and a winding roll speed were changed. A moisture percentage of the monolayer film was adjusted to 15% and the monolayer film was stretched three times in a vertical direction and three times in a horizontal direction at 80° C. by a tenter type simultaneous biaxial stretching facility, to provide a biaxially oriented monolayer film with a thickness of 15 μm. A multilayer structure was produced as described in Example 1, substituting the biaxially oriented monolayer film obtained for a monolayer film. Various evaluations were conducted for the multilayer structure obtained. The results are shown in Table 3.

Example 24

[Formation of a Coextruded Film]

Using the resin composition pellets obtained in Example 1, a polypropylene resin (Japan Polypropylene Corporation, "Novatec-PP EA7AD" (density: 0.90 g/cc, MFR (230° C., under a load of 2.16 kg): 1.4 g/10 min)) and a polypropylene adhesive resin (Mitsui Chemicals, Inc., "Admer QF500" (MFR (230° C., under a load of 2.16 kg): 3.0 g/10 min)), a 3-material 3-layer coextruded film (resin composition/polypropylene adhesive resin/polypropylene resin=9 μm/9 μm/81 μm) was formed. A thickness of the coextruded film was adjusted by appropriately changing a screw rotation speed and a winding roll speed. An extruder and extrusion conditions, and a die used were as follows.

Resin Composition

Extruder: single-screw extruder (TOYO SEIKI Co., Ltd., Labo Machine Model ME CO-EXT)

Screw: diameter 20 mmφ, L/D 20, full-flight screw

Extrusion temperature: feeding zone/compression zone/metering zone/die=230/230/230/230° C.

Polypropylene Adhesive Resin

Extruder: single-screw extruder (TECHNOVEL Corporation, SZW20GT-20MG-STD)

Screw: diameter 20 mmφ, L/D 20, full-flight screw

Extrusion temperature: feeding zone/compression zone/metering zone/die=150/200/220/230° C.

Polypropylene Resin

Extruder: single-screw extruder (PLABOR Research Laboratory of Plastics Technology Co., Ltd., GT-32-A)

Screw: diameter: 32 mmφ, L/D 28, full-flight screw

Extrusion temperature: feeding zone/compression zone/metering zone/die=170/220/230/230° C.

Die: a coathanger die for 3-material 3-layer with a width of 300 mm (PLABOR Research Laboratory of Plastics Technology Co., Ltd.)

Die temperature: 230° C.

A multilayer structure was produced as described in Example 1, substituting the coextruded film obtained for a monolayer film. Various evaluations were conducted for the multilayer structure obtained. The results are shown in Table 3.

In Table 2, a polypropylene adhesive resin and a polypropylene resin constituting a coextruded film were expressed as "PP" together.

Example 25

[Formation of a Biaxially Oriented Coextruded Film]

A 3-material 3-layer coextruded film (resin composition/polypropylene adhesive resin/polypropylene resin=27 μm/27 μm/243 μm) was formed as described in Example 24, except that a screw rotation speed and a winding roll speed were changed. The coextruded film was stretched three times in a vertical direction and three times in a horizontal direction at 150° C. by a tenter type sequential biaxial stretching facility, to provide a 3-material 3-layer biaxially oriented coextruded film (resin composition/polypropylene adhesive resin/polypropylene resin=3 μm/3 μm/27 μm).

A multilayer structure was produced as described in Example 1, substituting the biaxially oriented coextruded film obtained for a monolayer film. Various evaluations were conducted for the multilayer structure obtained. The results are shown in Table 3.

Comparative Example 7

On one side of the biaxially oriented polypropylene film BOPP30 described above, alumina was vapor-deposited to a thickness of 30 nm by a known vacuum vapor deposition method. Next, to one side of a non-oriented polypropylene film (Mitsui Chemicals Tohcello, Inc., "RXC-22", thickness: 50 μm), a two-component type adhesive ("Takelac A-520" and "Takenate A-50" from Mitsui Chemicals Inc.) was applied such that a dry thickness of the adhesive was 2 μm, and dried. Subsequently, the CPP on which the adhesive was applied and the BOPP film on which alumina was vapor-deposited were laminated, to provide a multilayer structure having a structure of (the outer layer side) BOPP30/AlOx/Ad2/CPP50 (the inner layer side). Various evaluations were conducted for the multilayer structure obtained. The results are shown in Table 3.

Comparative Example 8

A multilayer structure having a structure of (the outer layer side) BOPP30/Ad2/CPP50 (the inner layer side) was provided by laminating the CPP on which an adhesive was applied and the BOPP film as described in Comparative Example 7, except that alumina was not vapor-deposited on a biaxially oriented polypropylene film BOPP30. Various evaluations were conducted for the multilayer structure obtained. The results are shown in Table 3.

TABLE 1

| | Resin composition (x), barrier resin layer (X) | | | | | | | | | Inorganic barrier layer (Y) | |
|---|---|---|---|---|---|---|---|---|---|---|---|
| | EVOH(A) | | | | PA(B) | | Multivalent metal ion (C) | | | | |
| | Ethylene unit content mol % | MPDAc unit mol % | Saponification degree mol % | Content parts by mass | Type | Content parts by mass | Type | Compound | Content ppm | Type | Thickness nm |
| Example 1 | 38 | 1.5 | 100 | 85 | PA6 | 15 | Mg | Hydroxide | 120 | AlOx | 30 |
| Example 2 | 38 | 0 | 100 | 85 | PA6 | 15 | Mg | Hydroxide | 120 | AlOx | 30 |
| Example 3 | 38 | 0.2 | 100 | 85 | PA6 | 15 | Mg | Hydroxide | 120 | AlOx | 30 |
| Example 4 | 38 | 0.5 | 100 | 85 | PA6 | 15 | Mg | Hydroxide | 120 | AlOx | 30 |
| Example 5 | 38 | 2.5 | 100 | 85 | PA6 | 15 | Mg | Hydroxide | 120 | AlOx | 30 |
| Example 6 | 38 | 5 | 100 | 85 | PA6 | 15 | Mg | Hydroxide | 120 | AlOx | 30 |
| Example 7 | 38 | 0 | 100 | 95 | PA6 | 5 | Mg | Hydroxide | 120 | AlOx | 30 |
| Example 8 | 38 | 1.5 | 100 | 95 | PA6 | 5 | Mg | Hydroxide | 120 | AlOx | 30 |
| Example 9 | 27 | 1.5 | 100 | 85 | PA6 | 15 | Mg | Hydroxide | 120 | AlOx | 30 |
| Example 10 | 32 | 1.5 | 100 | 85 | PA6 | 15 | Mg | Hydroxide | 120 | AlOx | 30 |
| Example 11 | 44 | 1.5 | 100 | 85 | PA6 | 15 | Mg | Hydroxide | 120 | AlOx | 30 |
| Example 12 | 38 | 1.5 | 100 | 85 | PA6 | 15 | Mg | Hydroxide | 10 | AlOx | 30 |
| Example 13 | 38 | 1.5 | 100 | 85 | PA6 | 15 | Mg | Hydroxide | 450 | AlOx | 30 |
| Example 14 | 38 | 1.5 | 100 | 85 | PA6 | 15 | Mg | Acetate salt | 120 | AlOx | 30 |
| Example 15 | 38 | 1.5 | 100 | 85 | PA6 | 15 | Mg | Stearate salt | 120 | AlOx | 30 |
| Example 16 | 38 | 1.5 | 100 | 85 | PA6 | 15 | Ca | Stearate salt | 120 | AlOx | 30 |
| Example 17 | 38 | 1.5 | 100 | 85 | PA6 | 15 | Mg | Hydroxide | 120 | AlOx | 100 |
| Example 18 | 38 | 1.5 | 100 | 85 | PA6 | 15 | Mg | Hydroxide | 120 | SiOx | 30 |
| Example 19 | 38 | 1.5 | 100 | 85 | PA6 | 15 | Mg | Hydroxide | 120 | VM | 30 |
| Example 20 | 38 | 1.5 | 100 | 85 | PA6 | 15 | Mg | Hydroxide | 120 | VM | 70 |
| Example 21 | 38 | 1.5 | 100 | 85 | PA6 | 15 | Mg | Hydroxide | 120 | AlOx | 30 |
| Example 22 | 38 | 1.5 | 100 | 85 | PA6 | 15 | Mg | Hydroxide | 120 | AlOx | 30 |
| Example 23 | 38 | 1.5 | 100 | 85 | PA6 | 15 | Mg | Hydroxide | 120 | AlOx | 30 |
| Example 24 | 38 | 1.5 | 100 | 85 | PA6 | 15 | Mg | Hydroxide | 120 | AlOx | 30 |
| Example 25 | 38 | 1.5 | 100 | 85 | PA6 | 15 | Mg | Hydroxide | 120 | AlOx | 30 |
| Example 26 | 38 | 1.5 | 100 | 85 | PA6 | 15 | Mg | Hydroxide | 120 | AlOx | 30 |

TABLE 1-continued

| | Resin composition (x), barrier resin layer (X) | | | | | | | | | | Inorganic barrier layer (Y) | |
|---|---|---|---|---|---|---|---|---|---|---|---|---|
| | EVOH(A) | | | | PA(B) | | Multivalent metal ion (C) | | | | | |
| | Ethylene unit content mol % | MPDAc unit mol % | Saponification degree mol % | Content parts by mass | Type | Content parts by mass | Type | Compound | Content ppm | | Type | Thickness nm |
| Example 27 | 38 | 1.5 | 100 | 85 | PA6 | 15 | Mg | Hydroxide | 120 | | AlOx | 30 |
| Example 28 | 38 | 1.5 | 100 | 70 | PA6 | 30 | Mg | Hydroxide | 170 | | AlOx | 30 |
| Comparative Example 1 | 38 | 1.5 | 100 | 85 | — | — | Mg | Hydroxide | 120 | | AlOx | 30 |
| Comparative Example 2 | 38 | 1.5 | 100 | 50 | PA6 | 50 | Mg | Hydroxide | 170 | | AlOx | 30 |
| Comparative Example 3 | 18 | 1.5 | 100 | 85 | PA6 | 15 | Mg | Hydroxide | 120 | | AlOx | 30 |
| Comparative Example 4 | 48 | 1.5 | 100 | 85 | PA6 | 15 | Mg | Hydroxide | 120 | | AlOx | 30 |
| Comparative Example 5 | 38 | 1.5 | 100 | 85 | PA6 | 15 | Mg | Hydroxide | 120 | | — | — |
| Comparative Example 6 | 38 | 1.5 | 100 | 85 | PA6 | 15 | Mg | Hydroxide | 120 | | AlOx | 30 |
| Comparative Example 7 | — | — | — | — | — | — | — | — | — | | AlOx | 30 |
| Comparative Example 8 | — | — | — | — | — | — | — | — | — | | — | — |

TABLE 2

| | Multilayer structure | | | |
|---|---|---|---|---|
| | Layer configuration (Outer layer side - Inner layer side) | Total thickness μm | Total thickness of PP layers μm | Thickness ratio of PP layers |
| Example 1 | BOPP30/Ad2/Resin composition15/AlOx/Ad2/CPP50 | 99 | 80 | 0.81 |
| Example 2 | BOPP30/Ad2/Resin composition15/AlOx/Ad2/CPP50 | 99 | 80 | 0.81 |
| Example 3 | BOPP30/Ad2/Resin composition15/AlOx/Ad2/CPP50 | 99 | 80 | 0.81 |
| Example 4 | BOPP30/Ad2/Resin composition15/AlOx/Ad2/CPP50 | 99 | 80 | 0.81 |
| Example 5 | BOPP30/Ad2/Resin composition15/AlOx/Ad2/CPP50 | 99 | 80 | 0.81 |
| Example 6 | BOPP30/Ad2/Resin composition15/AlOx/Ad2/CPP50 | 99 | 80 | 0.81 |
| Example 7 | BOPP30/Ad2/Resin composition15/AlOx/Ad2/CPP50 | 99 | 80 | 0.81 |
| Example 8 | BOPP30/Ad2/Resin composition15/AlOx/Ad2/CPP50 | 99 | 80 | 0.81 |
| Example 9 | BOPP30/Ad2/Resin composition15/AlOx/Ad2/CPP50 | 99 | 80 | 0.81 |
| Example 10 | BOPP30/Ad2/Resin composition15/AlOx/Ad2/CPP50 | 99 | 80 | 0.81 |
| Example 11 | BOPP30/Ad2/Resin composition15/AlOx/Ad2/CPP50 | 99 | 80 | 0.81 |
| Example 12 | BOPP30/Ad2/Resin composition15/AlOx/Ad2/CPP50 | 99 | 80 | 0.81 |
| Example 13 | BOPP30/Ad2/Resin composition15/AlOx/Ad2/CPP50 | 99 | 80 | 0.81 |
| Example 14 | BOPP30/Ad2/Resin composition15/AlOx/Ad2/CPP50 | 99 | 80 | 0.81 |
| Example 15 | BOPP30/Ad2/Resin composition15/AlOx/Ad2/CPP50 | 99 | 80 | 0.81 |
| Example 16 | BOPP30/Ad2/Resin composition15/AlOx/Ad2/CPP50 | 99 | 80 | 0.81 |
| Example 17 | BOPP30/Ad2/Resin composition15/AlOx/Ad2/CPP50 | 99 | 80 | 0.81 |
| Example 18 | BOPP30/Ad2/Resin composition15/SiOx/Ad2/CPP50 | 99 | 80 | 0.81 |
| Example 19 | BOPP30/Ad2/Resin composition15/VM/Ad2/CPP50 | 99 | 80 | 0.81 |
| Example 20 | BOPP30/Ad2/Resin composition15/VM/Ad2/CPP50 | 99 | 80 | 0.81 |
| Example 21 | BOPP30/Ad2/AlOx/Resin composition15/Ad2/CPP50 | 99 | 80 | 0.81 |
| Example 22 | BOPP30/Ad2/Resin composition30/AlOx/Ad2/CPP50 | 114 | 80 | 0.70 |
| Example 23 | BOPP30/Ad2/BO Resin composition15/AlOx/Ad2/CPP50 | 99 | 80 | 0.81 |
| Example 24 | BOPP30/Ad2/(PP90/Resin composition9)/AlOx/Ad2/CPP50 | 183 | 170 | 0.93 |
| Example 25 | BOPP30/Ad2/BO(PP30/Resin composition3)/AlOx/Ad2/CPP50 | 117 | 110 | 0.94 |
| Example 26 | BOPET12/Ad2/Resin composition15/AlOx/Ad2/CPP50 | 81 | 50 | 0.62 |
| Example 27 | PE50/Ad2/BOPP30/Ad2/Resin composition15/AlOx/Ad2/CPP50 | 119 | 50 | 0.42 |
| Example 28 | BOPP30/Ad2/Resin composition15/AlOx/Ad2/CPP50 | 99 | 80 | 0.81 |
| Comparative Example 1 | BOPP30/Ad2/Resin composition15/AlOx/Ad2/CPP50 | 99 | 80 | 0.81 |
| Comparative Example 2 | BOPP30/Ad2/Resin composition15/AlOx/Ad2/CPP50 | 99 | 80 | 0.81 |

TABLE 2-continued

| | Multilayer structure | | | |
|---|---|---|---|---|
| | Layer configuration (Outer layer side - Inner layer side) | Total thickness μm | Total thickness of PP layers μm | Thickness ratio of PP layers |
| Comparative Example 3 | BOPP30/Ad2/Resin composition15/AlOx/Ad2/CPP50 | 99 | 80 | 0.81 |
| Comparative Example 4 | BOPP30/Ad2/Resin composition15/AlOx/Ad2/CPP50 | 99 | 80 | 0.81 |
| Comparative Example 5 | BOPP30/Ad2/Resin composition15/Ad2/CPP50 | 99 | 80 | 0.81 |
| Comparative Example 6 | BOPP30/Ad2/Resin composition15/Ad2/AlOx/CPP50 | 99 | 80 | 0.81 |
| Comparative Example 7 | BOPP30/AlOx/Ad2/CPP50 | 82 | 80 | 0.98 |
| Comparative Example 8 | BOPP30/Ad2/CPP50 | 82 | 80 | 0.98 |

TABLE 3

| | OTR (20° C., 65% RH) cc/($m^2$ · day · atm) | | | | | | | | | |
|---|---|---|---|---|---|---|---|---|---|---|
| | Before retorting | | After retorting | | | Total light transmittance | | Melt-molded product of pulverized multilayer structure | | |
| | — | After stretching | — | After bending | Appearance after retorting | Before retorting | After retorting | Hard spots | Coloring | Viscosity stability |
| Example 1 | A | B | B | B | A | A | A | B | B | B |
| Example 2 | A | C | B | C | A | A | A | B | B | B |
| Example 3 | A | C | B | C | A | A | A | B | B | B |
| Example 4 | A | C | B | B | A | A | A | B | B | B |
| Example 5 | A | B | B | B | A | A | A | B | B | B |
| Example 6 | A | B | B | C | A | A | A | B | B | B |
| Example 7 | A | C | C | C | B | A | A | A | B | A |
| Example 8 | A | B | C | C | B | A | A | A | B | A |
| Example 9 | A | B | B | C | A | A | A | B | C | C |
| Example 10 | A | B | B | B | A | A | A | B | B | B |
| Example 11 | A | B | C | C | C | A | C | B | A | A |
| Example 12 | A | B | B | B | A | A | A | D | A | D |
| Example 13 | A | B | B | B | A | A | A | A | D | D |
| Example 14 | A | B | B | B | A | A | A | B | B | B |
| Example 15 | A | B | B | B | A | A | A | C | A | B |
| Example 16 | A | B | B | B | A | A | A | C | A | C |
| Example 17 | A | B | A | B | A | A | A | B | B | C |
| Example 18 | A | B | B | B | A | A | A | B | B | B |
| Example 19 | A | C | C | C | B | D | D | B | C | B |
| Example 20 | A | B | B | B | B | D | D | B | D | C |
| Example 21 | A | B | C | C | C | A | A | B | B | B |
| Example 22 | A | B | B | B | B | A | A | C | C | C |
| Example 23 | A | B | A | B | A | A | A | B | B | B |
| Example 24 | A | B | B | B | A | A | A | A | A | A |
| Example 25 | A | B | B | B | A | A | A | A | A | A |
| Example 26 | A | B | C | C | B | A | A | D | B | B |
| Example 27 | A | B | B | B | C | A | B | B | B | B |
| Example 28 | A | B | A | B | A | A | A | B | B | B |
| Comparative Example 1 | A | D | C | D | D | A | B | A | B | A |
| Comparative Example 2 | A | C | C | D | A | A | A | D | C | D |
| Comparative Example 3 | A | B | C | D | D | A | A | C | D | C |
| Comparative Example 4 | A | B | C | D | D | A | C | B | A | A |
| Comparative Example 5 | E | E | E | E | A | A | A | B | B | A |
| Comparative Example 6 | A | C | D | E | A | A | A | B | B | B |

TABLE 3-continued

| | OTR (20° C., 65% RH) | | | | | | | | | |
|---|---|---|---|---|---|---|---|---|---|---|
| | Before retorting | | After retorting | | | Total light transmittance | | Melt-molded product of pulverized multilayer structure | | |
| | — | After stretching | — | After bending | Appearance after retorting | Before retorting | After retorting | Hard spots | Coloring | Viscosity stability |
| | cc/($m^2$ · day · atm) | | | | | | | | | |
| Comparative Example 7 | E | E | E | E | A | A | A | A | A | A |
| Comparative Example 8 | E | E | E | E | A | A | A | A | A | A |

The invention claimed is:

1. A multilayer structure comprising at least a barrier resin layer (X) and an inorganic barrier layer (Y) with a thickness of 500 nm or less which is adjacent to the barrier resin layer (X), wherein the layer (X) comprises a resin composition (x) made from an ethylene-vinyl alcohol copolymer (A), a polyamide (B), and a multivalent metal ion (C), in which a mass ratio of A to B (A/B) is 55/45 to 98/2;

the resin composition (x) comprises from 20 to 400 ppm of the multivalent metal ion (C);

the multivalent metal ion (C) comprises at least one multivalent metal ion selected from the group consisting of magnesium, calcium and zinc;

the multivalent metal ion (C) is contained as a hydroxide; and the ethylene-vinyl alcohol copolymer (A) has an ethylene content of 20 to 46 mol % and a saponification degree of 90 mol % or more.

2. The multilayer structure according to claim 1, wherein the ethylene-vinyl alcohol copolymer (A) is a modified ethylene-vinyl alcohol copolymer (A2) represented by Formula (I); content rates (mol %) of a, b and c to the total monomer units satisfy Formulas (1) to (3); and a saponification degree defined by Formula (4) is 90 mol % or more:

(I)

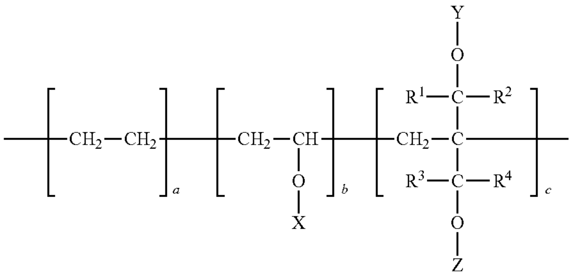

wherein $R^1$, $R^2$, $R^3$ and $R^4$ independently of each other represent a hydrogen atom or an alkyl group having 1 to 10 carbon atoms, and the alkyl group can comprise a hydroxy group, an alkoxy group or a halogen atom; X, Y and Z independently of each other represent a hydrogen atom, a formyl group or an alkanoyl group having 2 to 10 carbon atoms:

$$20 \leq a \leq 46 \quad (1)$$

$$0.3 \leq c \leq 10 \quad (2)$$

$$[100-(a+c)]\times 0.9 \leq b \leq [100-(a+c)] \quad (3)$$

$$\text{Saponification degree}=[(\text{the total molar number of } X, Y \text{ and } Z \text{ as } a \text{ hydrogen atom})/(\text{the total molar number of } X, Y \text{ and } Z)]\times 100 \quad (4).$$

3. The multilayer structure according to claim 1, wherein the multivalent metal ion (C) comprises magnesium.

4. The multilayer structure according to claim 1, wherein the barrier resin layer (X) is a monolayer film with a thickness of 8 to 40 μm.

5. The multilayer structure according to claim 4, wherein the monolayer film is biaxially oriented.

6. The multilayer structure according to claim 1, wherein the barrier resin layer (X) is one layer of a coextruded film consisting of 2 or more layers comprising the barrier resin layer (X); a thickness of the coextruded film is 8 to 120 μm; and a thickness of the barrier resin layer (X) is 0.5 to 20 μm.

7. The multilayer structure according to claim 6, wherein the coextruded film is biaxially oriented.

8. The multilayer structure according to claim 6, wherein layers other than the barrier resin layer (X) in the coextruded film consists of layers comprising a polypropylene resin as a main component.

9. The multilayer structure according to claim 1, wherein the multilayer structure does not comprise a layer comprising a resin having a melting point of lower than 140° C. as a main component, a layer comprising a resin having a melting point of 240° C. or higher as a main component, nor a metal layer with a thickness of 1 μm or more.

10. The multilayer structure according to claim 1, wherein a ratio of the total thickness of the layers comprising a polypropylene resin as a main component to the total thickness of the multilayer structure is 0.75 or more.

11. The multilayer structure according to claim 1, wherein the multivalent metal ion (C) comprises calcium.

12. The multilayer structure according to claim 1, wherein the resin composition (x) further comprises a phosphoric acid compound.

13. A packaging material for retort comprising the multilayer structure according to claim 1.

14. The packaging material for retort according to claim 13, wherein at least one barrier resin layer (X) is outer than the inorganic barrier layer (Y).

15. The packaging material for retort according to claim 13, wherein an oxygen transmission rate (under the conditions of 20° C. and 65% RH) after a retorting process at 125° C. for 60 min is less than 10 cc/($m^2$·day·atm).

16. The packaging material for retort according to claim 13, wherein a light transmittance at a wavelength of 600 nm after a retorting process at 125° C. for 60 min is 80% or more.

17. A recovered composition comprising a recovered material of the multilayer structure according to claim 1.

18. A method for recovering a multilayer structure comprising pulverizing the multilayer structure according to claim 1 followed by melt molding.

* * * * *